(12) United States Patent
Wu et al.

(10) Patent No.: US 12,002,252 B2
(45) Date of Patent: Jun. 4, 2024

(54) IMAGE MATCHING SYSTEM

(71) Applicant: Rakuten Group, Inc., Tokyo (JP)

(72) Inventors: Enyuan Wu, San Mateo, CA (US); Luis Bernardo, San Mateo, CA (US)

(73) Assignee: Rakuten Group, Inc., Tokyo (JP)

( * ) Notice: Subject to any disclaimer, the term of this patent is extended or adjusted under 35 U.S.C. 154(b) by 404 days.

(21) Appl. No.: 17/318,984

(22) Filed: May 12, 2021

(65) Prior Publication Data
US 2022/0366180 A1 Nov. 17, 2022

(51) Int. Cl.
| | | |
|---|---|---|
| G06V 10/44 | (2022.01) | |
| G06T 3/40 | (2006.01) | |
| G06T 3/60 | (2006.01) | |
| G06T 7/11 | (2017.01) | |
| G06T 7/13 | (2017.01) | |
| G06T 7/194 | (2017.01) | |
| G06V 10/25 | (2022.01) | |

(Continued)

(52) U.S. Cl.
CPC ............. *G06V 10/443* (2022.01); *G06T 3/40* (2013.01); *G06T 3/60* (2013.01); *G06T 7/11* (2017.01); *G06T 7/13* (2017.01); *G06T 7/194* (2017.01); *G06V 10/25* (2022.01); *G06V 10/32* (2022.01); *G06V 10/56* (2022.01); *G06T 2207/10024* (2013.01); *G06T 2207/20132* (2013.01); *G06T 2207/20212* (2013.01); *G06T 2210/12* (2013.01)

(58) Field of Classification Search
CPC .... G06V 10/25; G06V 10/255; G06V 10/443; G06V 10/56; G06V 10/32; G06T 7/194; G06T 7/11; G06T 7/13; G06T 3/40; G06T 3/60; G06T 2207/10024; G06T 2207/20132; G06T 2207/20212; G06T 2210/12

See application file for complete search history.

(56) References Cited

U.S. PATENT DOCUMENTS

| | | |
|---|---|---|
| 4,901,362 A | 2/1990 | Terzian |
| 9,224,060 B1 * | 12/2015 | Ramaswamy ......... G06V 40/67 |

(Continued)

OTHER PUBLICATIONS

Veltkamp et al. "Content-Based Image Retrieval Systems: A Survey", Department of Computing Science, Utrecht University, Oct. 1, 2000, pp. 1-62.

(Continued)

*Primary Examiner* — Margaret G Mastrodonato
(74) *Attorney, Agent, or Firm* — Troutman Pepper Hamilton Sanders LLP

(57) ABSTRACT

An image matching system includes a non-transitory computer-readable medium and a processor. The non-transitory computer-readable medium is configured to store information of a plurality of images. The processor is configured to identify an object area in an original image that illustrates an object. The processor is configured to normalize the object area, resulting in a normalized image. The processor is configured to calculate a shape vector and a color vector from the normalized image. The processor is configured to calculate a match score using the shape vector and the color vector. The processor is configured to determine if the non-transitory computer-readable medium stores an identical match for the original image based on the match score.

19 Claims, 25 Drawing Sheets

(51) Int. Cl.
*G06V 10/32* (2022.01)
*G06V 10/56* (2022.01)

(56) References Cited

U.S. PATENT DOCUMENTS

| | | | | |
|---|---|---|---|---|
| 2008/0109327 A1* | 5/2008 | Mayle | ............... | G06Q 30/0641 |
| | | | | 705/27.1 |
| 2013/0223723 A1* | 8/2013 | Shibahara | ............. | G01B 21/20 |
| | | | | 382/145 |
| 2015/0261803 A1* | 9/2015 | Song | .................. | G06F 16/2246 |
| | | | | 382/199 |
| 2023/0146134 A1* | 5/2023 | Selviah | ............... | G06V 20/653 |
| | | | | 345/419 |

OTHER PUBLICATIONS

Troungcong et al. "Video sequences association for people re-identification across multiple non-overlapping cameras Video sequences association for people re-identification across multiple non-overlapping cameras", HAL open science, Jan. 2009, pp. 179-189.
European Search Report for European Patent Application No. 22171568.3 dated Oct. 17, 2022.
Khan, Fahad Shahbaz, Joost Van de Weijer, and Maria Vanrell. "Modulating shape features by color attention for object recognition." International Journal of Computer Vision 98 (2012): 49-64. Springer 2012 pp. 1-17.
Office Action with English translation dated Nov. 8, 2023, from corresponding Taiwanese patent application No. 111117451.

* cited by examiner

Result Image 4

Result Image 3

Result Image 2

Result Image 1

Input Image

Atlanta Falcons

Kansas City Chiefs

Los Angeles Rams

Chicago Bears

Philadelphia Eagles

New Orleans Saints

Atlanta Falcons

Kansas City Chiefs

Los Angeles Rams

Chicago Bears

Philadelphia Eagles

New Orleans Saints logo

IMAGE MATCHING SYSTEM

FIELD

The present invention relates to an image matching system, in particular, for matching merchandise images.

BACKGROUND

Image matching, finding visually similar images in a large pool of images without using any other information (i.e. text labels/tags), has been a fascinating and challenging research area. In today's e-commerce era, image matching algorithms are fundamental to provide advanced features and functionality, for example, identical image match, product variant detection, similar product recommendation, and category-wise image classification.

Nature images, such as any image, can be conceptually divided into subject and the background. The goal is to find images containing the same subject. A good image match algorithm should have following characteristics: (1) size invariant—same subject with different relative sizes should be considered identical by the algorithm, (2) position invariant or translation invariant—images of same subject at different positions in the image should be considered identical, (3) rotation invariant—rotated images on 2-dimensional plane should be considered identical. There are other requirements for good image matching algorithms. For example, one requirement is 3-d rotation invariant, which means that images of the same subject taken from different viewpoint should be recognized as the same object.

Image matching has profound theoretical significance and various practical applications. There has been a lot of previous work focused in this area that can be categorized as handcrafted matching algorithm and machine learning based algorithm.

Handcrafted match algorithms usually extract distinctive invariant features from raw pixel values to perform reliable matching. Some well-known algorithms include scale-invariant feature transform (SIFT), speeded-up robust features (SURF), and maximally stable external regions (MSER). However, these "features" are usually sharp corners or junctions of multiple lines. A smooth-curved object, such as the image of a baseball or a solid-colored t-shirt, does not even have any "features", hence such objects cannot be matched. In addition, the overall shape of object is not accounted for, which makes it not suitable for general purpose image matching.

Machine learning algorithms use convolutional neural networks (CNN) for feature extraction. CNN was originally designed for image classification, and it was later adopted for image retrieval. In terms of accuracy, CNN based machine learning algorithms are comparable to classic handcrafted algorithms. This remains the last few areas that machine learning algorithms are not so much superior to traditional algorithms, because that image matching problems cannot be formulated into objective functions that machine learning relies on.

Existing image matching algorithms have several main drawbacks. For example, handcrafted algorithms do not work with simple objects with only smooth curves, and they ignore the overall shape of objects. On the other hand, machine learning algorithms miss object information related to color and cannot be easily modified to fix specific issues like patched color difference and sub-area difference. There is a fairly large amount of false identical matches where images are almost same except for some small areas. There are lack of ways to tweak and improve the algorithm without modifying and retraining the model.

In view of the foregoing, a need exists for an image matching system that solves the above drawbacks in the existing algorithms. There is also a need for an image matching system that achieves the three invariants during the image matching process: size invariant, position invariant, and 2-d rotation invariant. Embodiments of the present disclosure are directed to this and other considerations.

SUMMARY

Aspects of the disclosed technology include systems and methods for image matching. Consistent with the disclosed embodiments, an image matching system includes a non-transitory computer-readable medium and a processor. The non-transitory computer-readable medium is configured to store information of a plurality of images. The processor is configured to identify an object area in an original image that illustrates an object. The processor is configured to normalize the object area, resulting in a normalized image. The processor is configured to calculate a shape vector and a color vector from the normalized image. The processor is configured to calculate a match score using the shape vector and the color vector. The processor is configured to determine if the non-transitory computer-readable medium stores an identical match for the original image based on the match score.

Another aspect of the disclosed technology relates to an image matching method. The method may include identifying, by a processor, an object area in an original image that illustrates an object. The method may include normalizing, by the processor, the object area, resulting in a normalized image. The method may include calculating, by the processor, a shape vector and a color vector from the normalized image. The method may include calculating, by the processor, a match score using the shape vector and the color vector. The method may include determining, by the processor, if a non-transitory computer-readable medium stores an identical match for the original image based on the match score, wherein the non-transitory computer-readable medium stores information of a plurality of images.

An additional aspect of the disclosure technology relates to a computer program product for image matching. The computer program product comprises a computer-readable storage medium containing computer program code. The computer program code may allow identifying, by a processor, an object area in an original image that illustrates an object. The computer program code may allow normalizing, by the processor, the object area, resulting in a normalized image. The computer program code may allow calculating, by the processor, a shape vector and a color vector from the normalized image. The computer program code may allow calculating, by the processor, a match score using the shape vector and the color vector. The computer program code may allow determining, by the processor, if a non-transitory computer-readable medium stores an identical match for the original image based on the match score, wherein the non-transitory computer-readable medium stores information of a plurality of images.

Further features of the present disclosure, and the advantages offered thereby, are explained in greater detail hereinafter with reference to specific embodiments illustrated in the accompanying drawings, wherein like elements are indicated by like reference designators.

BRIEF DESCRIPTION OF THE DRAWINGS

Reference will now be made to the accompanying drawings, which are not necessarily drawn to scale, and which are incorporated into and constitute a portion of this disclosure, illustrate various implementations and aspects of the disclosed technology and, together with the description, explain the principles of the disclosed technology. In the drawings:

FIG. 13, with partial views

DETAILED DESCRIPTION

Some implementations of the disclosed technology will be described more fully with reference to the accompanying drawings. This disclosed technology may, however, be embodied in many different forms and should not be construed as limited to the implementations set forth herein. The components described hereinafter as making up various elements of the disclosed technology are intended to be illustrative and not restrictive. Many suitable components that would perform the same or similar functions as components described herein are intended to be embraced within the scope of the disclosed electronic devices and methods. Such other components not described herein may include, but are not limited to, for example, components developed after development of the disclosed technology.

It is also to be understood that the mention of one or more method steps does not preclude the presence of additional method steps or intervening method steps between those steps expressly identified.

Reference will now be made in detail to exemplary embodiments of the disclosed technology, examples of which are illustrated in the accompanying drawings and disclosed herein. Wherever convenient, the same references numbers will be used throughout the drawings to refer to the same or like parts.

Terms such as "index" and "vector" may be used interchangeably, each of which may refer to an array of floating point numbers.

Figure 1:
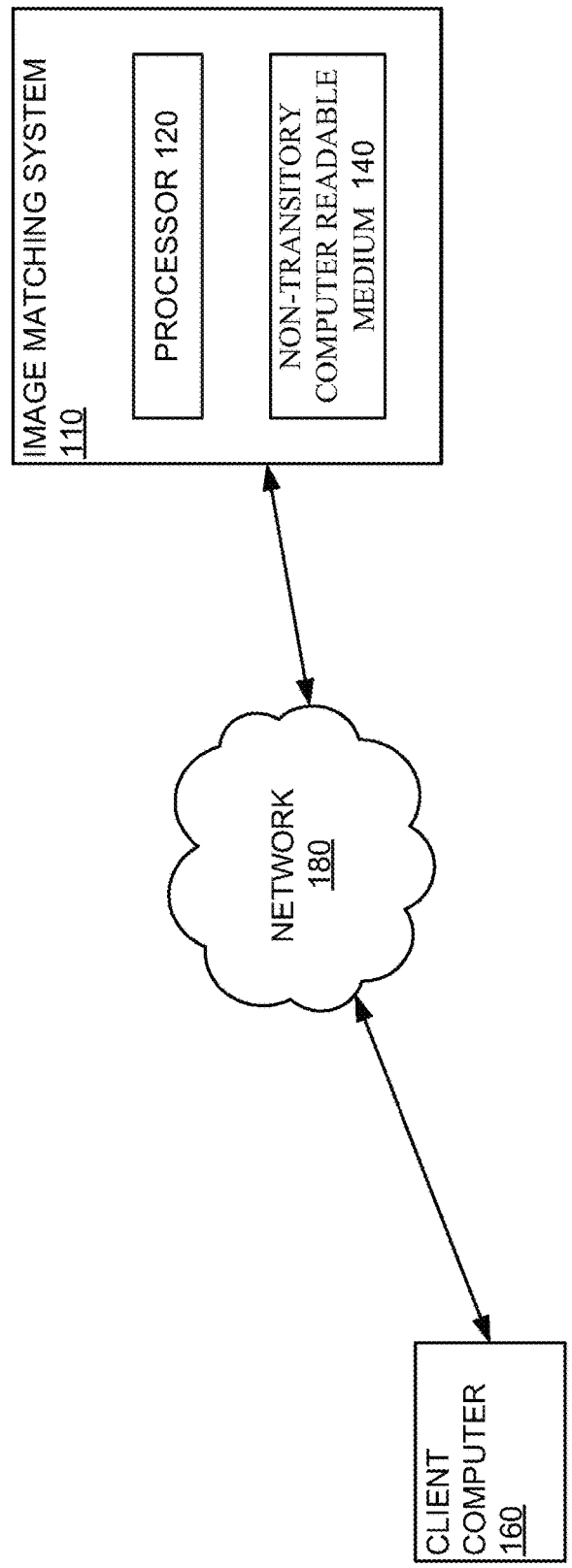
FIG. 1 is a diagram of an example environment that may be used to implement one or more embodiments of the present disclosure.

FIG. 1 shows an example environment 100 that may implement certain aspects of the present disclosure. The components and arrangements shown in FIG. 1 are not intended to limit the disclosed embodiments as the components used to implement the disclosed processes and features may vary. As shown in FIG. 1, in some implementations the environment 100 may include one or more of the following: an image matching system 110, a network 180, and a client computer 160. The image matching system 110 may include a processor 120 and a non-transitory computer readable medium 140. The client computer 160 may send input image to the image matching system 110. The client computer 160 may receive, view or display image matching results from the image matching system 110.

The processor 120 may target at a sub-category of images, such as merchandise images, with mostly clean background and objects that are on two-dimensional planes. The images processed by the processor 120 may have clean or smooth background. In some embodiments, the images processed by the processor 120 may have noisy background where the subject and background are not separatable. The processor 120 may perform matching based on the entire image, not just the subject alone.

When performing image matching, the processor 120 may handle size invariant, position invariant, and 2-d rotation invariant.

The processor 120 may perform two processes, including a preparation process and a matching process. In the preparation process, lots of images, such as millions of images may be processed, and there may be no client computer 160 involved. Once the preparation is completed, each image may be associated with one shape vector and one color vector. These vectors may be used to populate a database table, such as an Elasticsearch index. These vectors may be stored in the non-transitory computer readable medium 140. In the matching process, an input image may be sent to the processor 120 from the client computer 160. The input image may go through the vector creation process. A quick search may be performed to narrow down to a small number of candidates. For each candidate, the match score may be calculated and the ones above the threshold may be returned. In one example, the resulting shape vector and color vector may be used to find similar vectors in the Elasticsearch index. The processor 120 may perform false identical match check based on the shape vector and the color vector. If any similar vectors are found within the threshold, the corresponding images along with match score may be sent back to the client computer 160. If no matches are found, an empty result set may be sent to client computer 160 to indicate no matches found.

Figure 2:
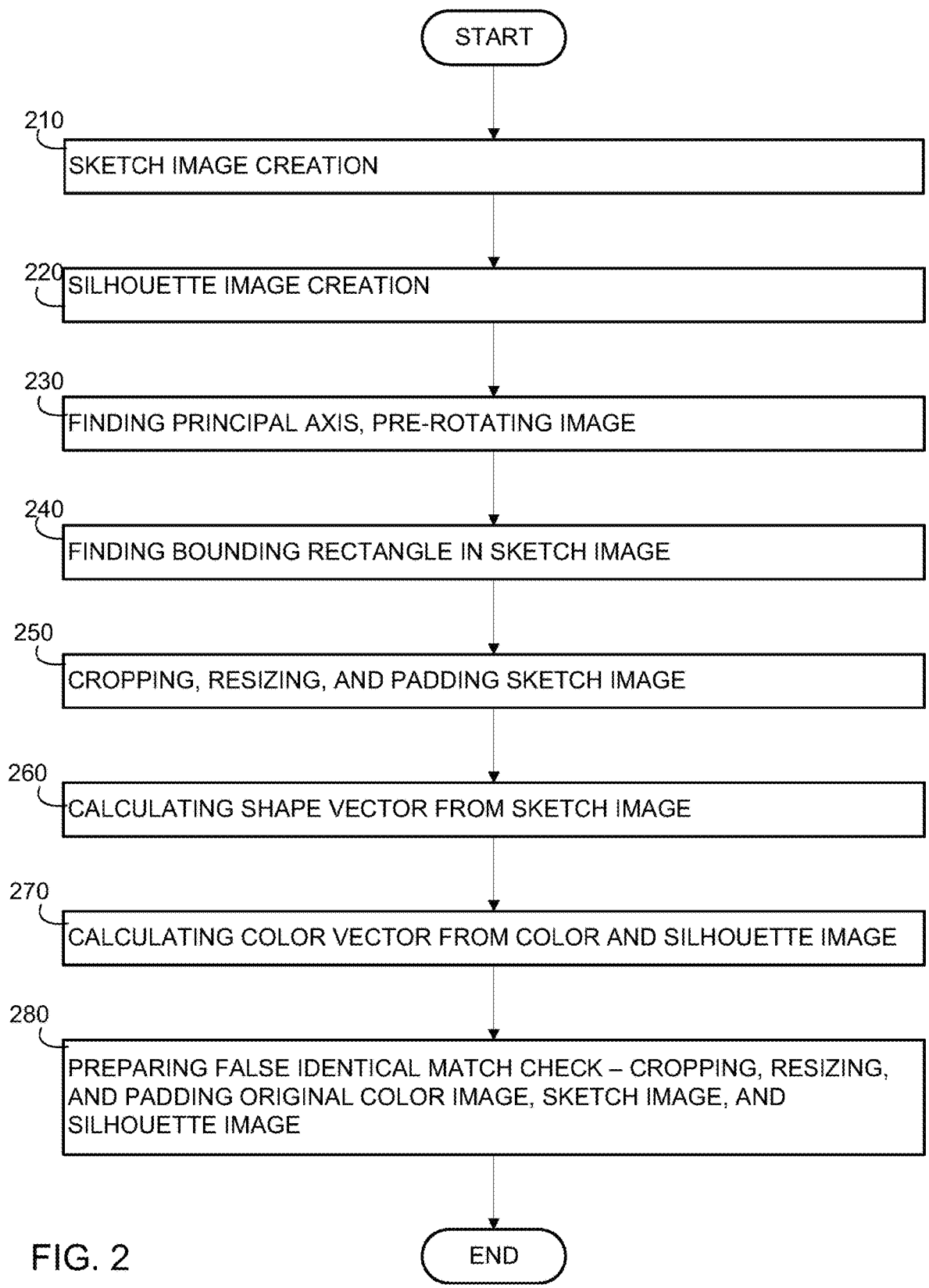
FIG. 2 is an example flow chart of a process performed by an image matching system according to one aspect of the present disclosure.

FIG. 2 illustrates an example flow chart of a preparation process of image matching performed by the processor 120.

At 210, the processor 120 may perform sketch image creation. At 220, the processor 120 may perform silhouette image creation. At 230, the processor 120 may find principal axis and pre-rotate the silhouette image. At 240, the processor 120 may perform finding bounding rectangle in sketch image. At 250, the processor 120 may perform cropping, resizing, and padding sketch image. At 260, the processor 120 may perform calculating shape vector from sketch image. At 270, the processor 120 may perform calculating color vector from color and silhouette image. At 280, the processor 120 may prepare false identical match check, including cropping, resizing, and padding original color image, sketch image, and silhouette image.

Figure 3:
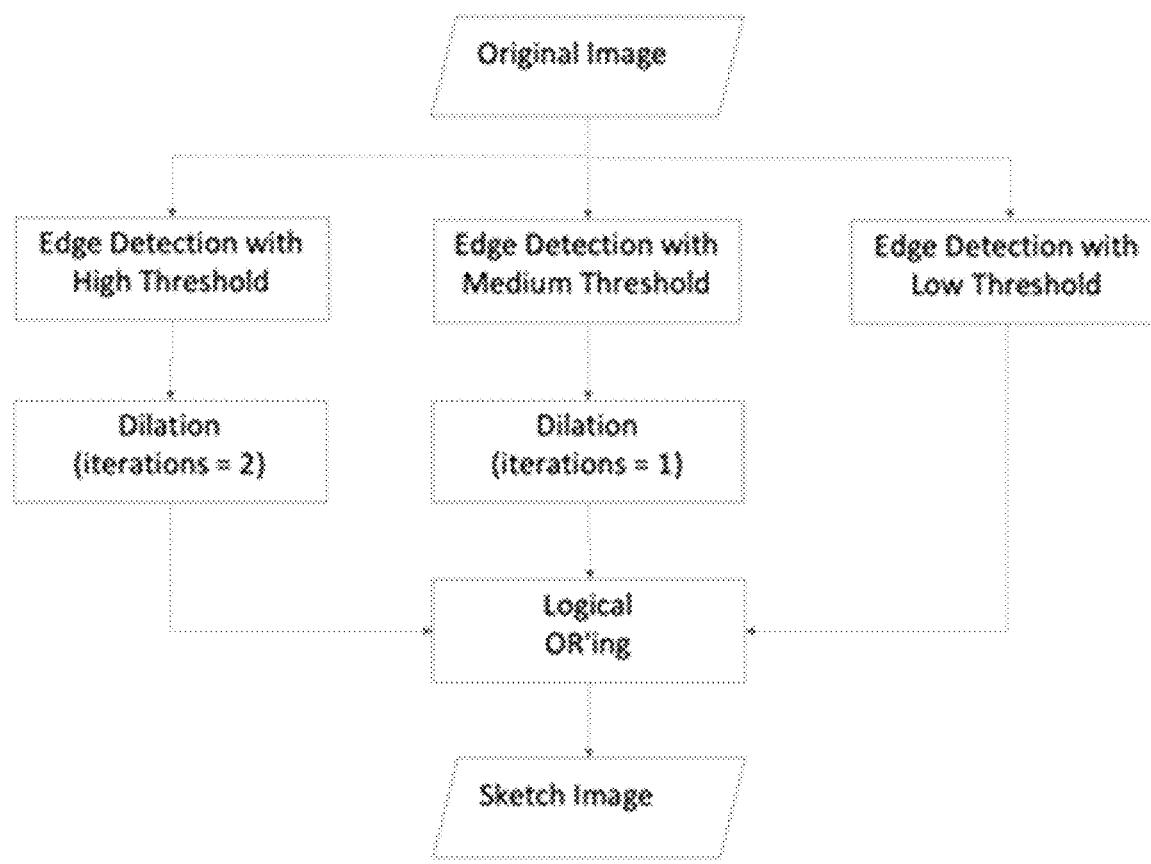
FIG. 3 illustrates a process 300 for using edge detection to create the sketch image according to one aspect of the present disclosure.

At 210, the processor 120 may first convert an original image into a sketch representation using edge detection. The processor 120 may use edge detection to create an abstract image that looks like a sketch drawing of objects, which may be referred to as a "sketch" image. FIG. 3 illustrates a process 300 for using edge detection to create the sketch image. Edge detection may be done with three different sets of threshold values: high (threshold1=150, threshold2=300), medium (threshold1=100, threshold2=200), and low (threshold1=50, threshold2=100). The edge detection process may implement any available edge detection algorithm, such as "Canny edge detection" named after Professor John Canny. The Canny edge detection algorithm uses two thresholds, while other edge detection algorithms use one or two thresholds. The edge detection algorithms all use some kind of thresholds to determine how much detail is in the resulting edge image.

Figure 4:
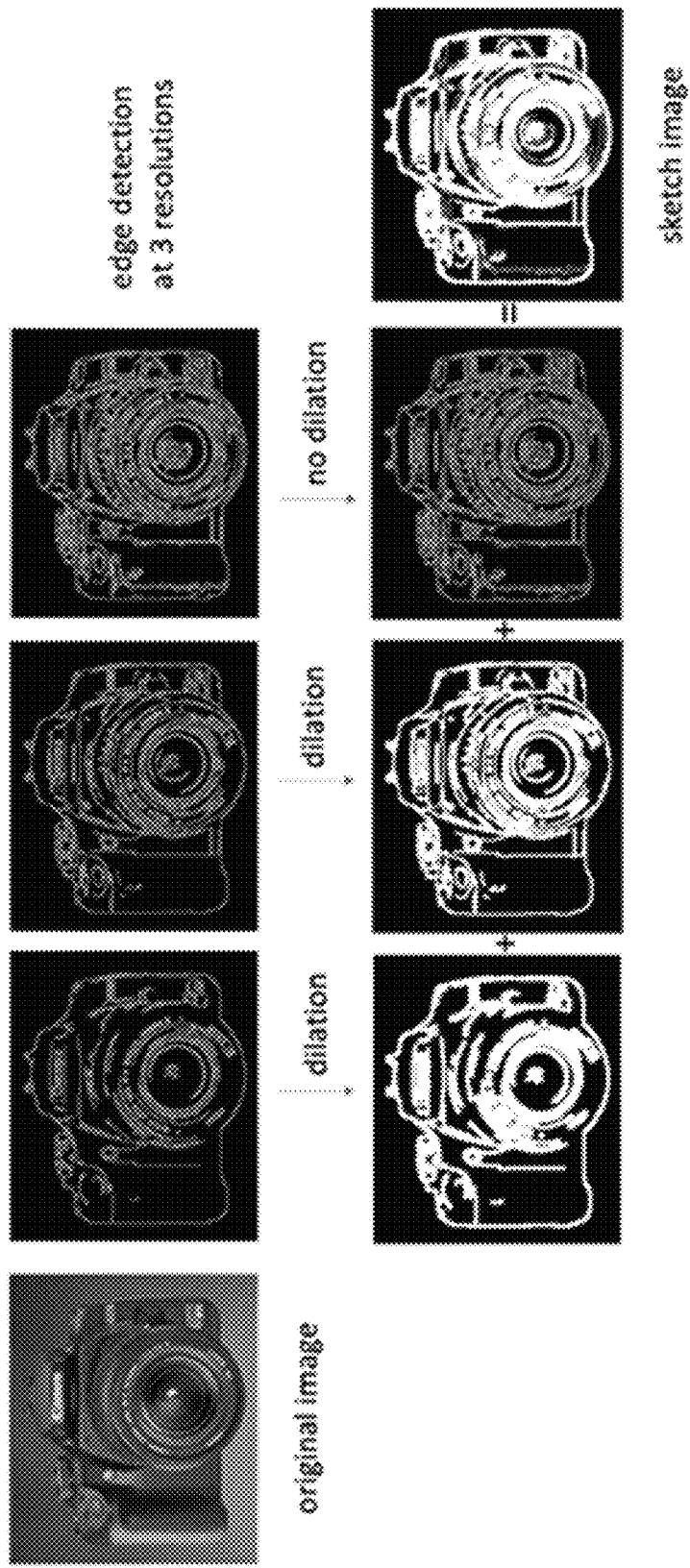
FIG. 4 illustrates a process of how the sketch image is generated from the original image according to one aspect of the present disclosure.

Edge images may be dilated with iterations 2 and 1 for high- and medium-resolution edge images, respectively. Dilation may refer to a process of thickening lines in the sketch image during processing. There may be no dilation for the low-resolution edge image. Finally, three dilated images may be combined with logical OR operation. FIG. 4 illustrates how the sketch image may be generated from the original image as a result of the above process. In FIG. 4, the original image may be in color, while remaining illustrations of FIG. 4 may be in black and white.

Figure 5:
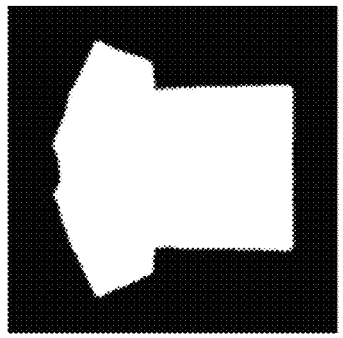
FIG. 5 illustrates some sample results of converting the original image into a silhouette image according to one aspect of the present disclosure.
Figure 5:
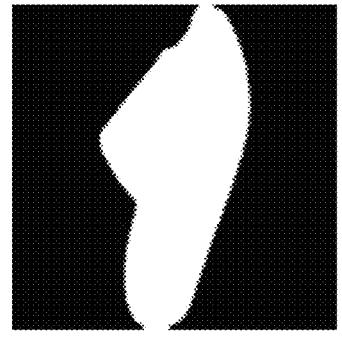
Figure 5:
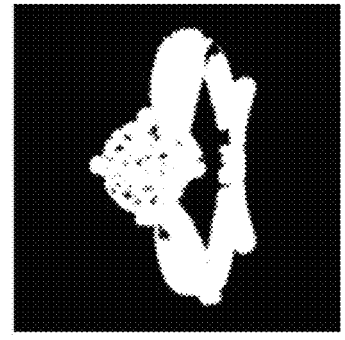
Figure 5:
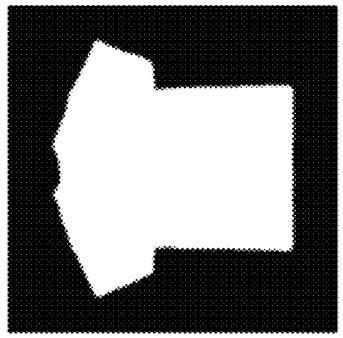
Figure 5:
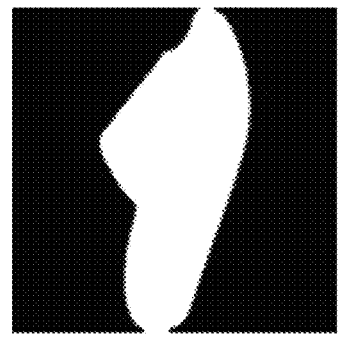
Figure 5:
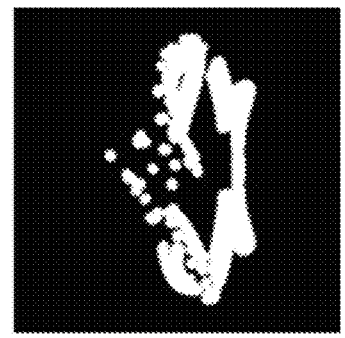
Figure 5:
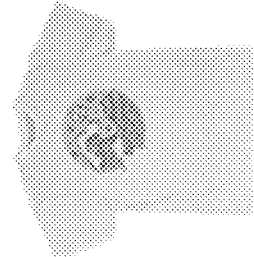
Figure 5:
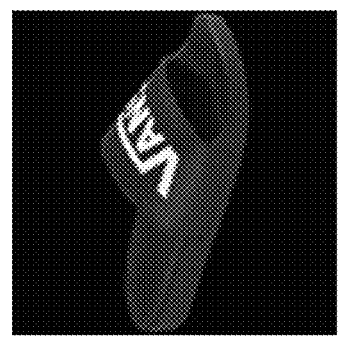
Figure 5:
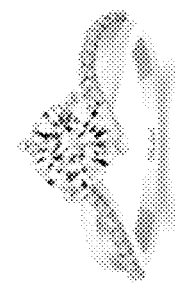

Turning back to FIG. 2, at 220, the processor 120 may convert the original image into a silhouette image. The processor 120 may segment main objects from the background using either image segmentation algorithm from Scikit-image or OpenCV. When the silhouette image is not so good due to not enough contrast between the subject and background, the processor 120 may partially fix the problem by logically OR'ing (logical OR operation) silhouette and the sketch image. FIG. 5 illustrates some sample results. In FIG. 5, the original images may be in color, while remaining illustrations of FIG. 5 may be in black and white.

Figure 6:
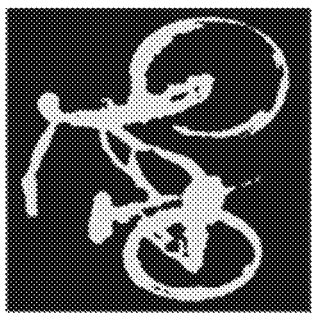
FIG. 6 illustrates some examples of silhouette creation according to one aspect of the present disclosure.
Figure 6:
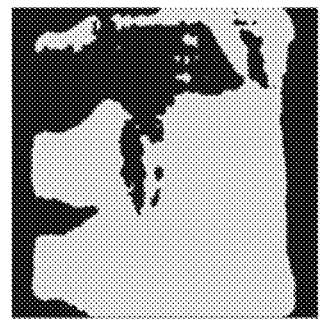
Figure 6:
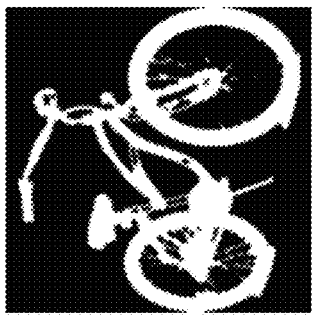
Figure 6:
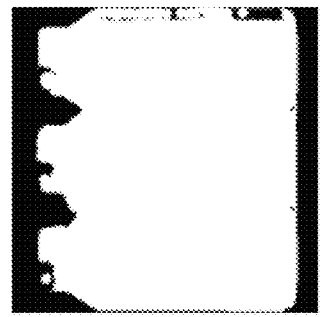
Figure 6:
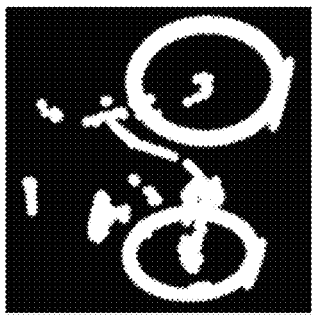
Figure 6:
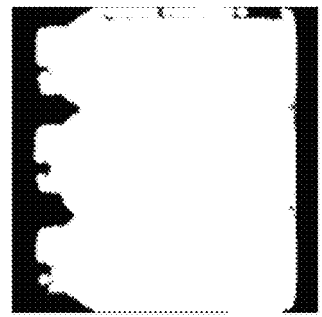
Figure 6:
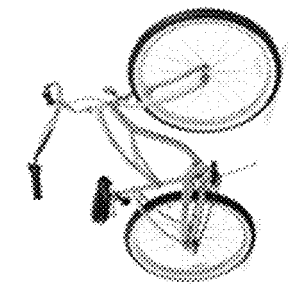
Figure 6:
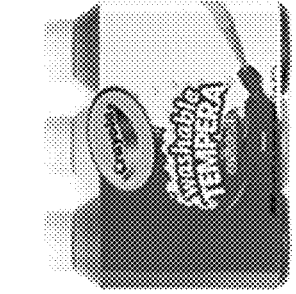

General-purpose machine learning algorithms for silhouette creation generally rely on what the foreground object might be. The closest machine learning algorithms may be image segmentation, which may work well if the object is in the predefined categories, may not work well if the object is not in the predefined categories, or may not work at all sometimes. FIG. 6 illustrates some examples. In FIG. 6, the original images may be in color, while silhouette and fix illustrations of FIG. 6 may be in black and white. The machine learning silhouettes of FIG. 6 may be in color.

Figure 7:
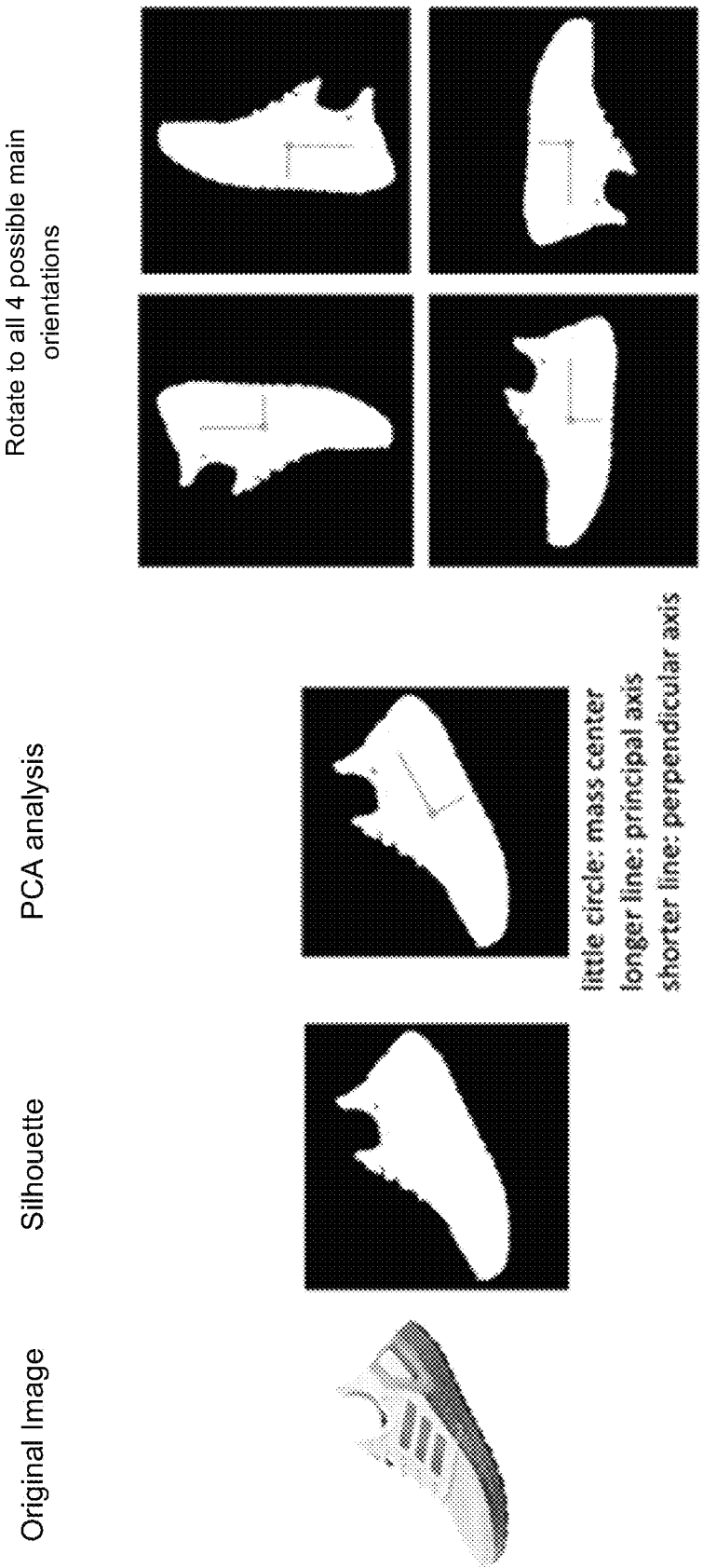
FIG. 7 illustrates some examples of rotating an image according to one aspect of the present disclosure.

Turning back to FIG. 2, the processor 120 may find a mass center, a principal axis of the object in the silhouette image, and pre-rotate the silhouette image. The processor 120 may pre-rotate the object so that the principal axis points to up, right, down and left directions so that object at any 2-d orientation may be compared. The processor 120 may perform Principal Component Analysis (PCA). PCA is a statistical procedure that extracts the most important features of a dataset. The dataset may refer to an image such as the silhouette image. The processor 120 may use the OpenCV implementation to calculate the position of mass center, and orientation for principal axis and secondary axis. The secondary axis may be perpendicular to the principal axis. The processor 120 may rotate the silhouette image so that the principal axis points upright. Now images may be compared regardless of the original orientation. Sometimes when the object is aligned roughly on diagonal directions, small changes may cause the object in totally different way, such as upright or horizontal. To avoid such issues, the processor 120 may rotate a first aligned image by 90, 180, and 270 degrees to cover all four possible main orientations. The rotation operation may need to be performed on the sketch image as well. FIG. 7 illustrates some examples. In FIG. 7, the original image may be in color, while remaining illustrations of FIG. 7 may be in black and white. In one embodiment, a flag may be set indicating if the processor 120 performs rotation-invariant matching. If the flag is true, the processor 120 may use all four images. Four shape vectors may be calculated from rotated images. One color vector may be calculated from the image in the original orientation. Color vectors may be calculated based on the rotated images, but the results from four rotated images may be the same. In one embodiment, the processor 120 may use pre-rotated (first aligned) sketch image to calculate one shape vector and silhouette image in the original orientation to calculate one color vector. If the flag is false, the processor 120 may skip step 230 illustrated in FIG. 2 and only use sketch image and silhouette image in the original orientation. The default value for the flag may be false.

Figure 8:
FIG. 8 illustrates an example of identifying a bounding rectangle in the sketch image according to one aspect of the present disclosure.

Turning back to FIG. 2, the processor 120 may identify a bounding rectangle in the sketch image at step 240. FIG. 8 illustrates an example.

Figure 10:
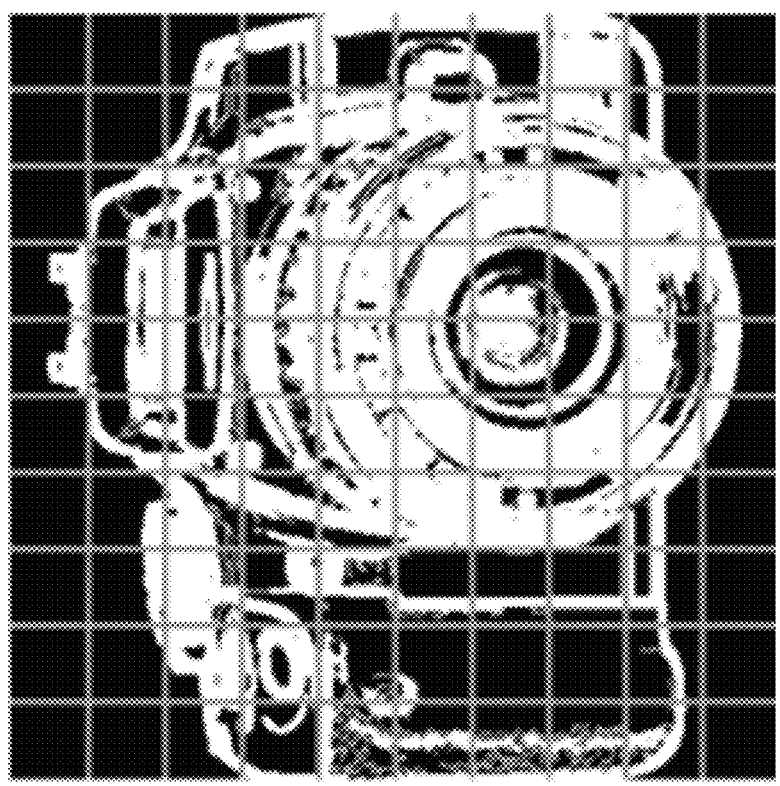
FIG. 10 illustrates dividing a normalized sketch image into multiple cells according to one aspect of the present disclosure.

Turning back to FIG. 2, at 250, the processor 120 may perform cropping, resizing and padding sketch images, all of which may be referred to as normalization. After these operations, all images may be of the same size so that the processor 120 may compare them pixel by pixel, or cell by cell as illustrated in FIG. 10. In one embodiment, the processor 120 may crop the sketch image with the bounding box so that the object is enclosed in a square bounding box and touches either both top and bottom edges or both the left and right edges of the bounding box.

Figure 9:
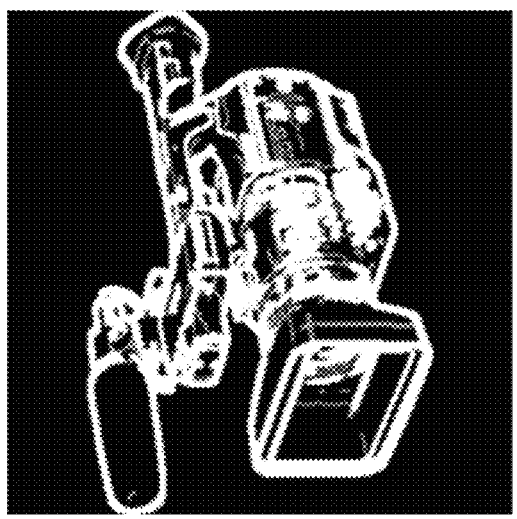
FIG. 9 illustrates some examples of cropping, resizing and padding sketch images according to one aspect of the present disclosure.
Figure 9:
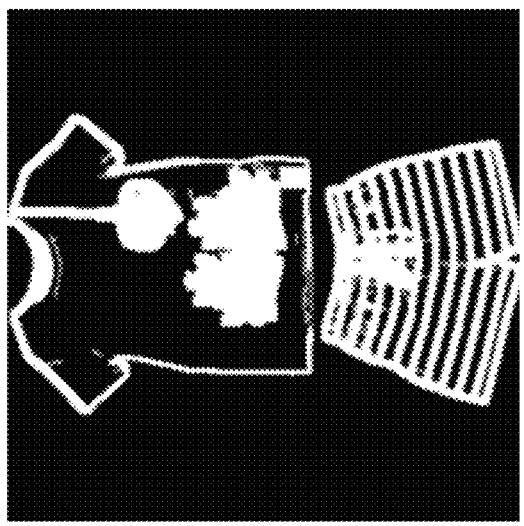
Figure 9:
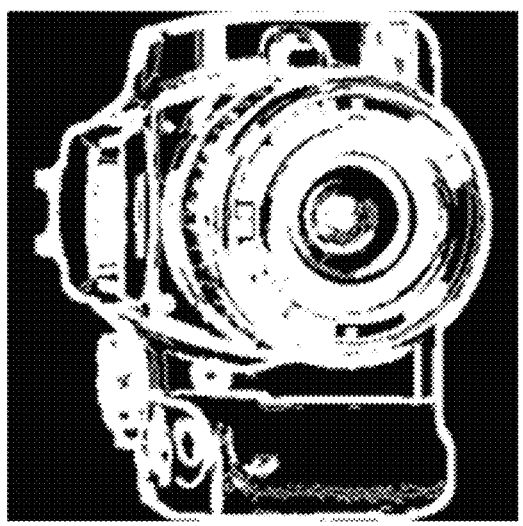

The processor 120 may then resize the cropped sketch image to a standard size so as to enable comparison between images. The processor 120 may resize the input image as well as the silhouette image to a standard size in the same way. In one example, the processor 120 may resize the cropped sketch image to max dimension. In one example, the max vector dimension in Elasticsearch is 1,024. Square root of 1024 is 32, which means that 32×32 cells. If each cell has 10×10=100 pixels, the image size is 320×320 (32× 10=320). If each cell has 12×12=144 pixels, the image size is 384×384 (32×12=384). In one example, the processor 120 may resize the cropped sketch image to 384×384 pixel if the object is square, or either the width or the height is 384 pixels if the object is not square. The processor 120 may then pad the sketch image to be square, resulting in a normalized sketch image. FIG. 9 illustrates some example results. Tall object may touch both top and bottom borders, whereas wide object may touch both left and right borders.

Turning back to FIG. 2, the processor 120 may calculate shape vector from the normalized sketch image at 260. Each image may be represented by a 1024-dimensional shape vector. The non-transitory computer readable medium 140 may store information of a plurality of product images, such as 10 million shape vectors. If it is a 1-dimensional vector, binary search tree (BST) may be used to find the best matches. For example, the range may be cut by half iteratively, until the matches are found. For multi-dimensional vectors, k-d tree (k dimensional search tree), ball tree, database (like Google BigQuery), or Elasticsearch index may be used to perform the search. In one example, Elasticsearch has the best performance and is the most cost-effective.

The processor 120 may calculate the shape vector by dividing, such as 32 blocks in each dimension, the normalized sketch image into multiple cells as illustrated in FIG. 10. FIG. 10 illustrates 10×10 cells. The processor 120 may count bright pixels per cell. The processor 120 may calculate the percentage of bright pixels in each cell.

Figure 11:
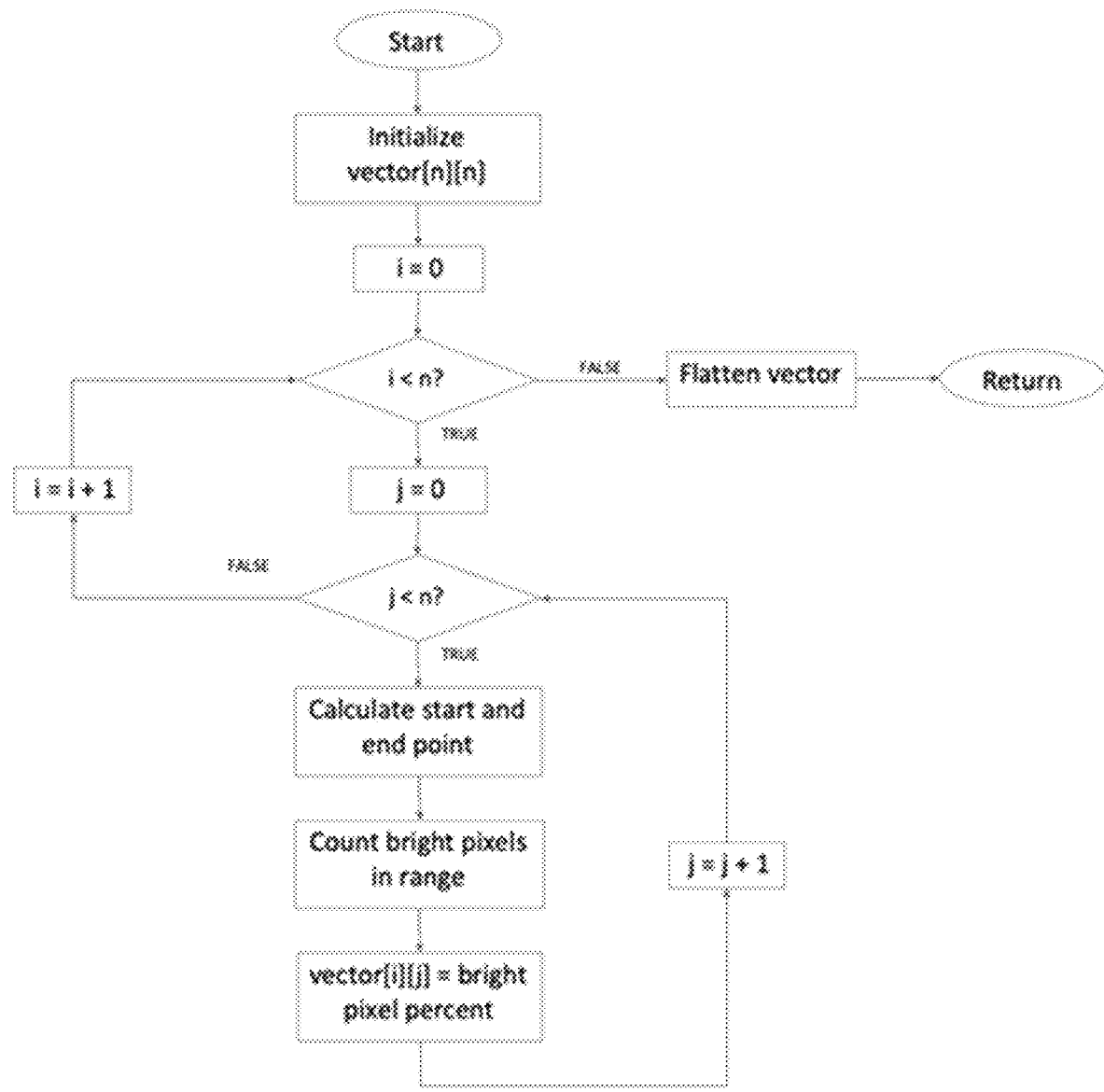
FIG. 11 illustrates a flow chart of calculating shape vector from a normalized sketch image according to one aspect of the present disclosure.

When an image size is 384×384 pixels, the processor 120 may divide it into 32×32 blocks, resulting in a total of 1,024 cells (32×32). Each cell may be 12×12 pixels. 384 pixels divided by 32 blocks results in 12 pixels. FIG. 11 illustrates a flowchart of the calculation, when n is 32. FIG. 11 illustrates a flowchart for a double loop. First, a 2-d vector, vector[32][32] (n=32), is initialized. Then, the image may be looped through row by row using "i" as the looping counter. Within each row, each column may be looped through using "j" as the looping counter. The body of the double loop may be the lower three boxes. For example, if i=3 and j=5 ($6^{th}$ cell on the $4^{th}$ row), start point may be (96, 128) and end point may be (127, 159) where 96=32×3 and 127=32×4−1. This cell contains all 144 pixels in the rectangle with top-left corner at (96, 128) and lower-right corner at (127, 159). If the bright pixel count is 53, then the bright cell percent is $53/144$=0.368, hence vector[3][5]=0.368. Once the double loop is done, the 2-d vector (each dimension has 32 elements) may be converted into a 1-d vector of 1024 elements. The above process may be referred to as "flatten".

Turning back to FIG. 2, the processor 120 may calculate color vector from color and the silhouette image at 270. In one embodiment, step 270 may not rely on step 260. Step 270 may branch after step 220, so that step 270 may be parallel to steps 230 to 280. Step 270 may not rely on normalized sketch image.

The processor 120 may divide the entire RGB color space, such as 256×256×256, into 64 buckets (4×4×4). The processor 120 may loop through each foreground pixel, where pixels in silhouette are bright, and assign to one of the 64 buckets. In one embodiment, foreground pixels are the white pixels on the silhouette images, whereas black pixels are the background of images which are ignored. In the silhouette of FIG. 7, foreground pixels are the white shoe shaped area, the rest black portion represents background pixels.

Figure 12:
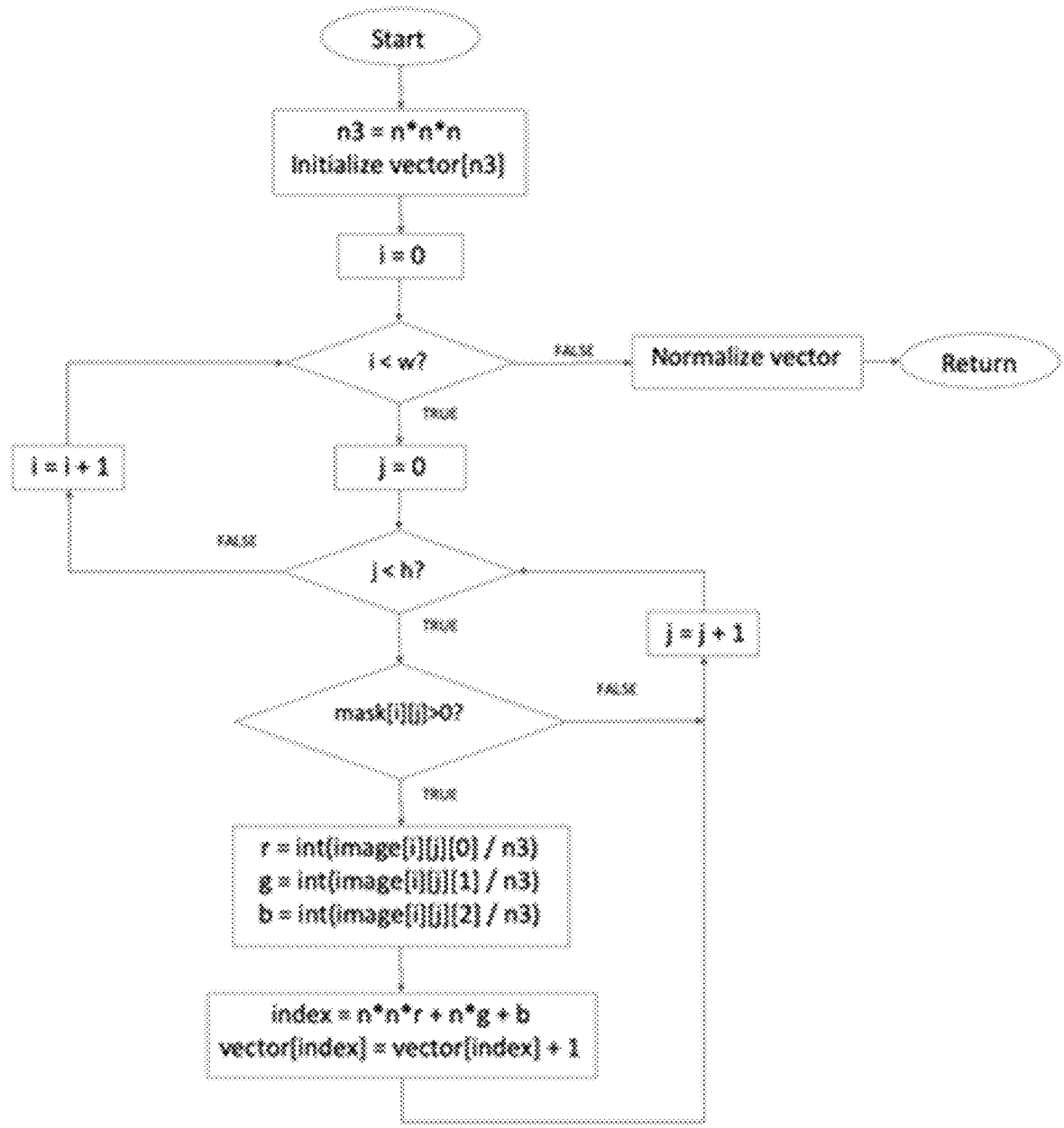
FIG. 12 illustrates a flow chart of calculating color vector according to one aspect of the present disclosure.
Figure 13A:
FIGS 13A-13D, illustrates color distribution histograms for two images according to one aspect of the present disclosure. The spatial relationship between the partial views is provided by FIG. 13 and allow for alignment thereof, given the guidance from FIG. 13.
Figure 13B:
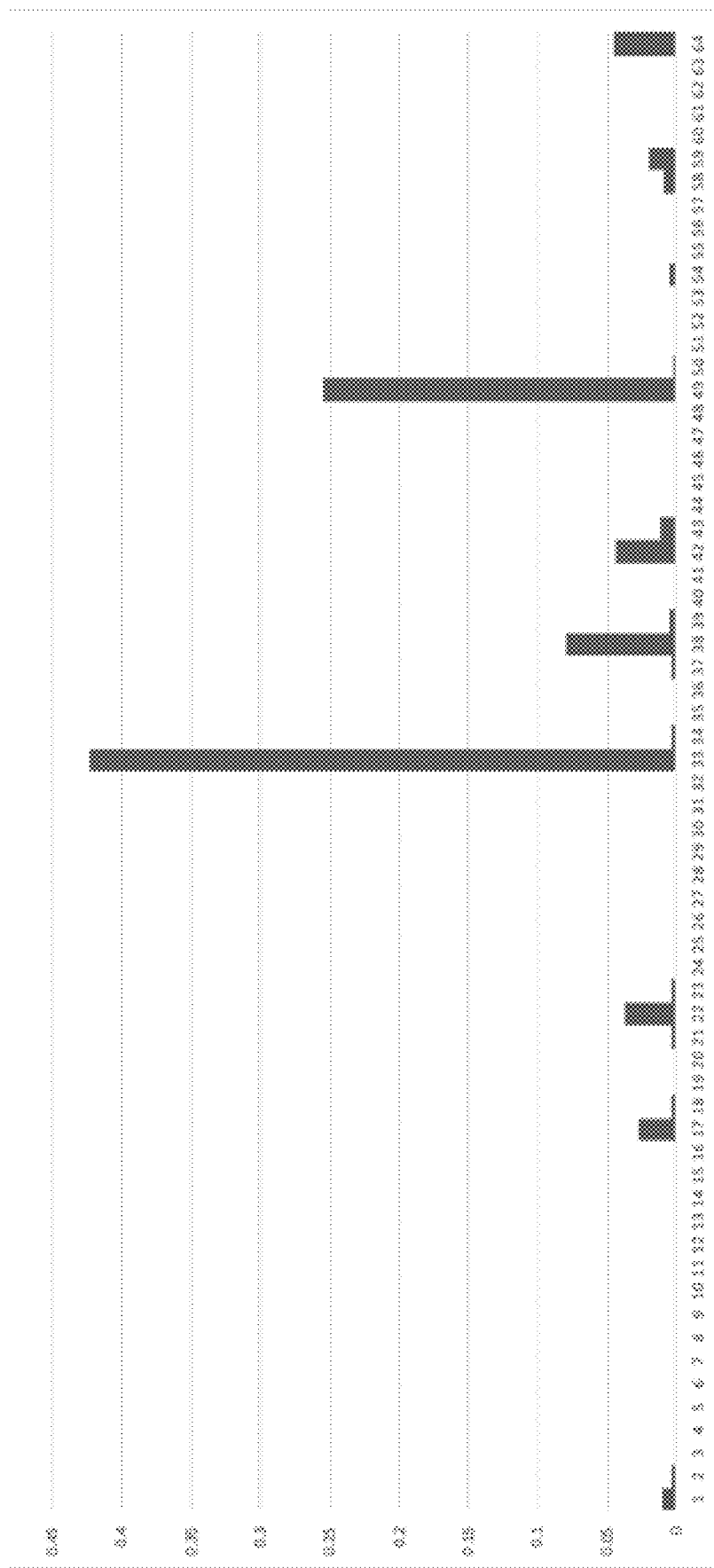
Figure 13C:
Figure 13D:
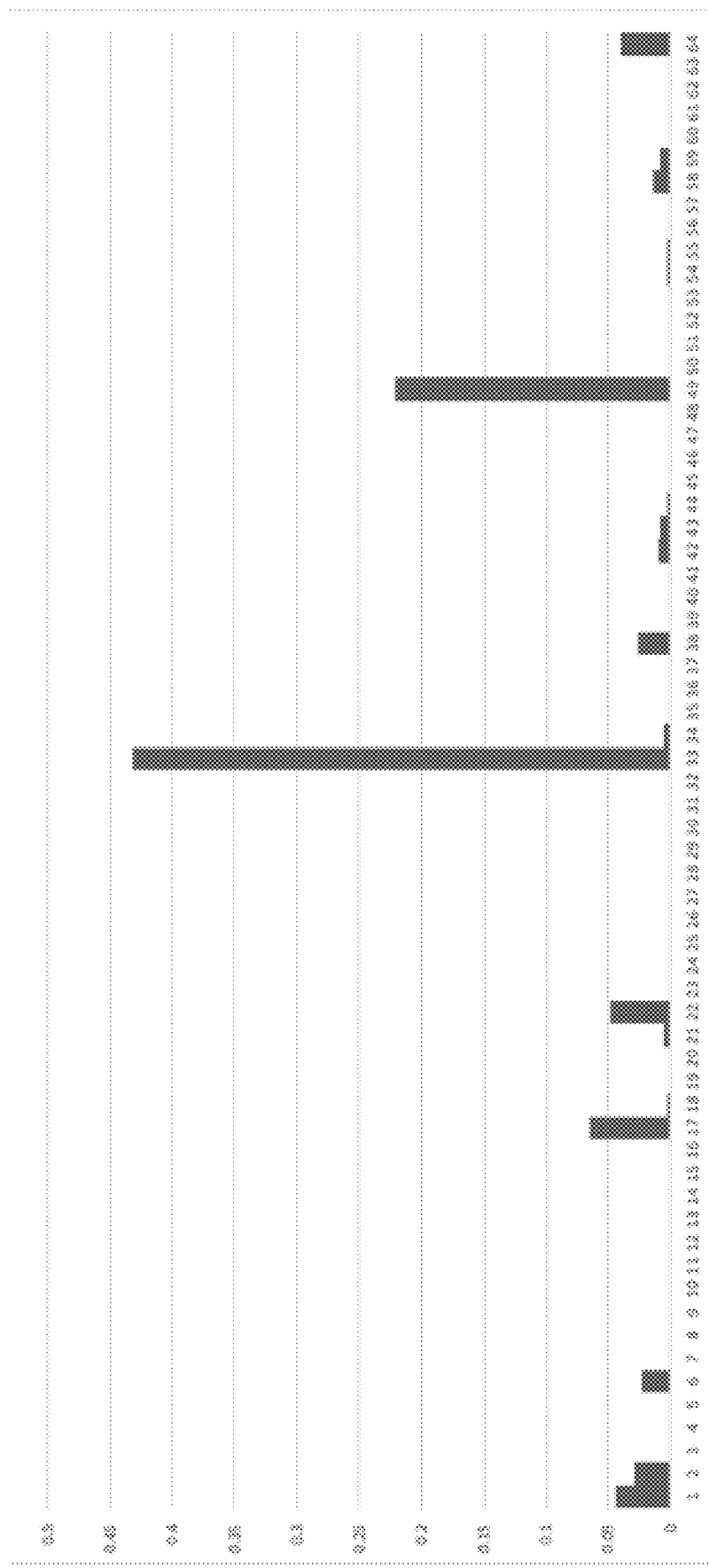

Finally, the processor 120 may normalize the color vector. The processor 120 may introduce color distribution histogram to capture object color information to enable comparison. FIG. 12 illustrates a flowchart, where n=4, w=384, and h=384.

FIG. 12 illustrates a double loop, row by row as the outer loop, and column by column as the inner loop. The "n" variable may refer to the number of values on one dimension of RGB color space. When n=4, there may exist 64 buckets. The "w" variable may refer to the width of the image, such as w=384. The "w" variable may also refer to the number of rows of the image. The "h" variable may refer to the height of the image, such as h=384. The "h" variable may also refer to the number of columns per row. First, a vector is initialized to store the result, the vector is 1-d, the number of elements is 64 and the initial value of 0. The body of the double loop may be the conditional check and two boxes at the bottom half of the flowchart. In one example, when i=123 and j=97, mask is the silhouette image and it is greyscale. Each pixel may be 1-d or just a scalar number. It is a dark pixel if the value equals to 0. It is a bright pixel if the value is greater than 0. If mask[123][97] is not greater than 0 (so it is 0), it is a dark pixel and no process is performed. If it is a bright pixel, calculations are performed in the two boxes below. The "image" variable in FIG. 12 may refer to the normalized color image with 384×384 as the size. Each pixel may be a 1-d array with three elements, for example, image[123][97]=(201, 87, 149), meaning Red=201, Green=87, and Blue=149. After RGB values are divided by n3 (that is 64), the integer part is taken: r=int (201/64)=int(3.14)=3, g=int(87/64)=int(1.36)=1, b=int(149/ 64)=int(2.33)=2. Then, index=n*n*r+n*g+b=4*4*3+4*1+ 2=48+4+2=54. Then, the value in vector[54] is incremented by 1. After the double loop is finished, the vector may include values such as (27, 5, 235, 0, 14, . . . ). The sum may be taken. Each element may be divided by the sum. The distribution may be obtained, and the last step may be referred to as "normalize".

Figures 13, 13A, 13C:
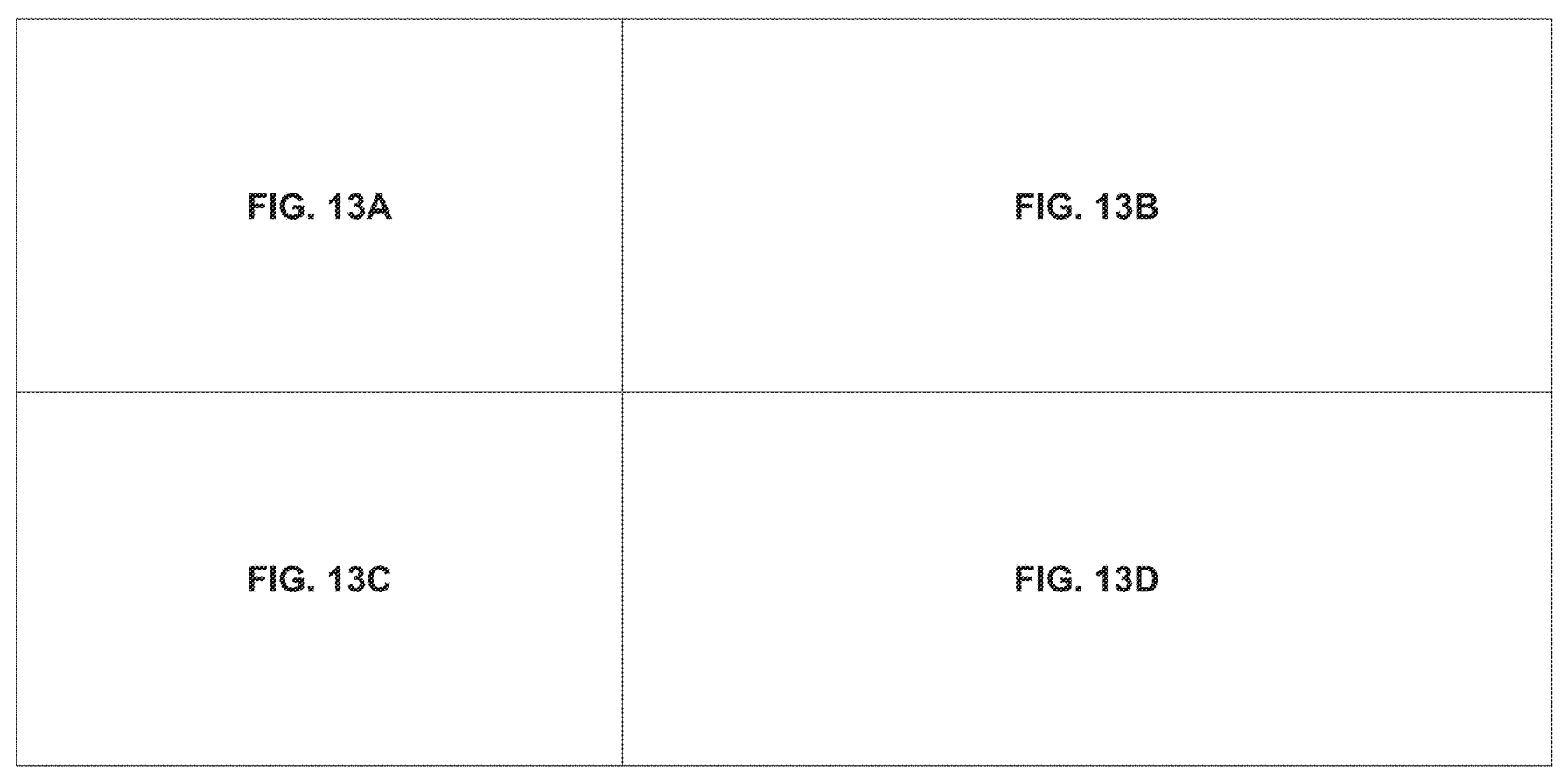

FIG. 13 illustrates some sample results, such as two images and their histograms. T-shirts in the two images may be in red.

Turning back to FIG. 2, the processor 120 may prepare false identical match check, including cropping, resizing, and padding original color image, sketch image, and silhouette image at 280. The processor may repeat the same operation in step 250 on the original color image, edge-detected image, and the silhouette image, and save them for future use (removal of false identical matches). The processor 120 may match images using vector representations of the images.

The processor 120 may perform a large-scale search using Elasticsearch, where Elasticsearch is better than search trees in terms of both index-populating and search performance. The processor 120 may compute similarity between images. On the original image, the processor 120 may use Elasticsearch as the search software for CNN Vector, shape and color vectors. Numerical vector is a data type in Elasticsearch. For example, "dense vector" is one type of numeric vector.

Locality sensitive hashing ("LSH") is a method to improve search efficiency. LSH computes a hash value, such as an integer, from the shape vector in such a way that similar vectors have same hash value, and this hash value is used to filter the Elasticsearch index. In an example of 10,000,000 vectors, to avoid looping through these 10,000,000 shape vectors every time when an image match is performed, LSH may divide these 10,000,000 vectors into 10,000 buckets, and each bucket may have one unique hash value, such as an integer. The hash value for shoes may be so much different from that of TV sets. Therefore, when using LSH to search for a TV set, only the TV set bucket is studied while ignoring the rest 9,999 buckets.

Below is the schema of Elasticsearch index:

```
"mappings": {
    "properties": {
        "img_name": {
            "type": "keyword"
        },
        "cnn_signature_256_0": {
            "type": "long"
        },
        "cnn_signature_256_1": {
            "type": "long"
        },
        "cnn_signature_256_2": {
            "type": "long"
        },
        "cnn_signature_256_3": {
            "type": "long"
        },
        "cnn_vector_256": {
            "type": "dense_vector",
            "dims": 256
        },
        "cnn_vector_1024": {
            "type": "dense_vector",
            "dims": 1024
        },
        "shape_signature_256_0": {
            "type": "long"
        },
        "shape_signature_256_1": {
            "type": "long"
        },
        "shape_signature_256_2": {
            "type": "long"
        },
        "shape_signature_256_3": {
            "type": "long"
        },
        "shape_vector_256": {
            "type": "dense_vector",
            "dims": 256
        },
        "shape_vector_1024": {
            "type": "dense_vector",
            "dims": 1024
        },
        "color_vector_64": {
            "type": "dense_vector",
            "dims": 64
        }
    }
}
```

The following table provides explanation about the schema.

TABLE 1

| Field Name | Data Type | Notes |
| --- | --- | --- |
| img_name | keyword | Image name, may contain category/product id |
| cnn_signature_256_0 | long | First hash value of CNN vector 256-d |
| cnn_signature_256_1 | long | Second hash value of CNN vector 256-d |
| cnn_signature_256_2 | long | Third hash value of CNN vector 256-d |
| cnn_signature_256_3 | long | Forth hash value of CNN vector 256-d |
| cnn_vector_256 | dense vector (256) | CNN vector, 256 dimensions |
| cnn_vector_1024 | dense vector (1024) | CNN vector, 1024 dimensions |
| shape_signature_256_0 | long | First hash value of Shape vector 256-d |
| shape_signature_256_1 | long | Second hash value of Shape vector 256-d |
| shape_signature_256_2 | long | Third hash value of Shape vector 256-d |
| shape_signature_256_3 | long | Forth hash value of Shape vector 256-d |
| shape_vector_256 | dense vector (256) | Shape vector, 256 dimensions |
| shape_vector_1024 | dense vector (1024) | Shape vector, 1024 dimensions |
| color_vector_64 | dense vector (64) | Color vector, 64 dimensions |

In Table 1, signatures, such as "cnn_signature_256_0", are calculated from corresponding vectors, see explanation about LSH (locality sensitive hashing) above. To avoid miss anything due to bucketizing, four different ways may be used to do the LSH. When performing the search, four LSH signatures may be created from the search image. Four searches may be performed using each LSH signature. The search result sets may be joined from these four searches. The "cnn_vector_256" vector may be created by a convolutional neural network (CNN) machine learning model, so as to compare the method of the present disclosure with the machine learning method. The CNN model is available as open source.

The processor 120 may reduce image vectors, either CNN vector (1024-$d$) or Shape vector (1024-$d$), to 256 dimensions. The processor 120 may calculate four LSH values for both CNN vector 256-$d$ and Shape vector 256-$d$. All fields in the table may consist of data for one image, and data for all images may be populated into the Elasticsearch index.

In the search phase, the input image may be processed the same way. Either cnn_vector_256 or shape_vector_256 may be used for search, along with the hash values. For every product image, all fields listed in Table 1 are created. The basic value is shape_vector_1024, which is calculated from all image processing. Since shape_vector_1024 has 1,024 dimensions, and search on these many dimensions is a bit slow, a smaller version shape_vector_256 that has 256 dimensions may be created by average neighboring four values into one (1024/4=256). To speed up the search process, LSH is used to search on a small and relevant subset. Four different LSH are used to avoid missing any matches due to this bucketizing. Then, all results are joined from these four LSH filtered searches (on shape_vector_256). For each of the match, the distance (or the score) between the image to search and the matching image may be calculated by using shape_vector_1024 and the threshold to remove the matches with lower scores (or larger distances). Then, the color vector 64 may be used to calculate the score and further remove matches with lower scores. Finally, the false identical match check is performed, and false identical matches are removed. Then, the matched images may be determined and returned. All these steps may be performed starting with the CNN_vector_1024, just as a comparison, that is what those CNN_* values are used for, and they are optional.

Figure 14:
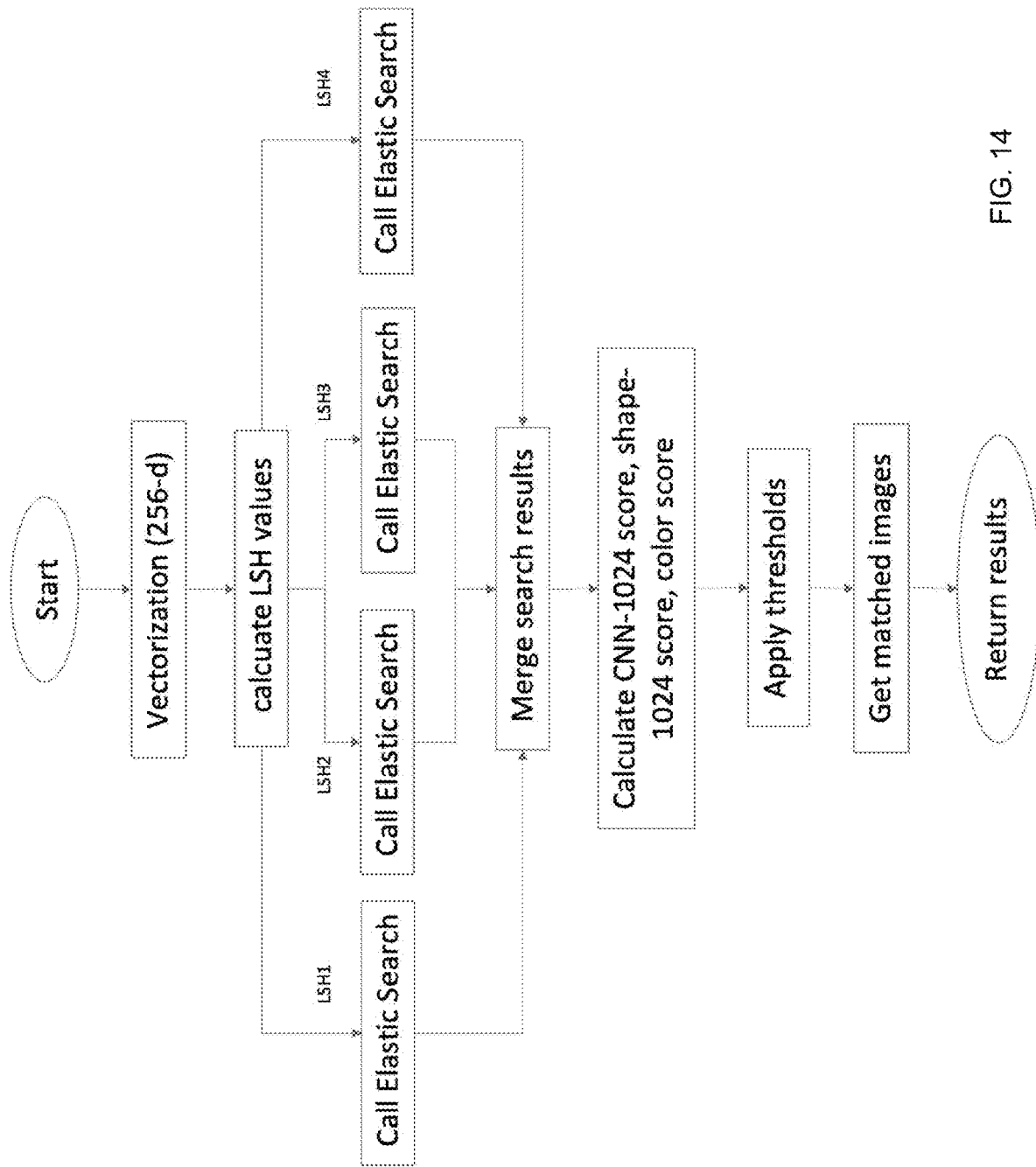
FIG. 14 illustrates a flow chart of identifying matched images based on vectorization according to one aspect of the present disclosure.

Specifically, four search requests may be sent to call the service, each with one hash value. The hash value may be used to filter out the subset of images to search on. Four hash values may be used to ensure no match missed due to filtering. After the search is done, CNN vector 1024-*d* and Shape vector 1024-*d* may be used to calculate match score using cosine similarity, along with color match score calculated using cosine similarity. Distance and score are two related concepts. If there are only two dimensions v0(x0, y0) and v1(x1, y1), the distance is sqrt((x0−x1)$^2$+(y0−y1)$^2$). The smaller the better match. Two identical vectors may give a distance of 0. Score, or cosine similarity, may be defined as (x0*x1+y0*y1)/(sqrt(x0$^2$+y0$^2$)*sqrt(x1$^2$+y1$^2$)). The higher the score the better match. Two identical vectors may have a score of 1. These scores may be used to determine if it is an identical match or not. The processor 120 may use two CNN models MobileNet and NASNet: MobileNet score>=0.90, NASNet score>=0.88. For these models: shape score>=0.92 and color score>=0.965. FIG. 14 illustrates A flowchart of the search phase. In FIG. 14, between steps of "apply thresholds" and "get matched images", the false identical match checking step is performed.

There may exist false identical match issues. For example, one issue may be referred to as patch color difference where overall shape and color for a number of images are all above the similarity threshold, and yet there are patches in the images with different color.

Figure 15B:
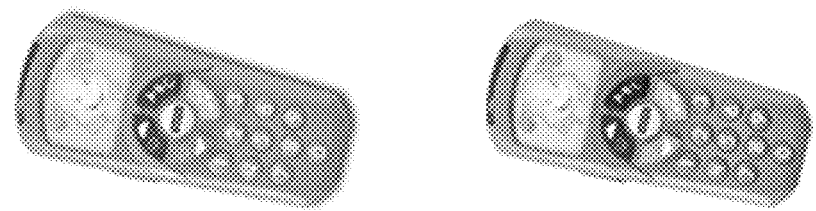
FIG. 15B illustrates returned matches for the remote control of FIG. 15A according to one aspect of the present disclosure.
Figure 15B:
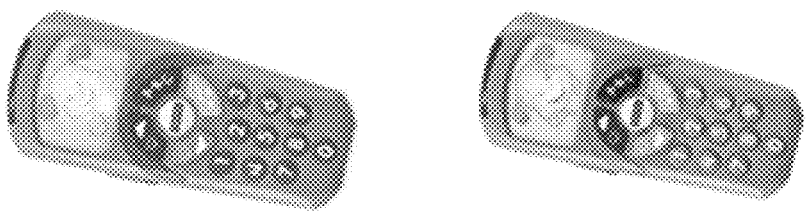
Figure 15A:
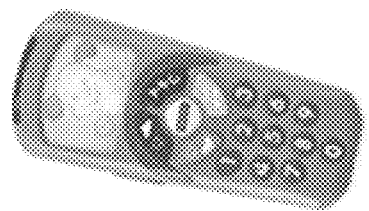
FIG. 15A illustrates a remote control as a search target according to one aspect of the present disclosure.

When searching for a remote control with light blue buttons as illustrated in FIG. 15A, four matches as identical matches based on vector similarity may be returned as illustrated in FIG. 15B. In FIG. 15A, the remote control has light blue buttons, and the cartoon character within the display may have green ears. In FIG. 15B, the top left match may have blue buttons, and the cartoon character within the display may have green ears. The top right match may have purple buttons, and the cartoon character within the display may have orange ears. The bottom two matches may have pink buttons, and the cartoon character within the display may have orange ears. Apparently, only the first one is an identical match (By the way, the first matching image is not the image itself). The last three result images cannot be excluded by tightening the thresholds, doing so would eliminate many other qualified matches and decrease the match accuracy. There are three concepts to describe how good a model or method is: precision, recall, and accuracy. If the search returns 10 matches but only 8 are correct, then the precision is 8/10=80%. If there are 10 actual matches in the dataset and our search returns 7 matches, then the recall is 7/10=70%. The accuracy, or called "F1 score", is defined as 2*precision*recall/(precision+recall)=2*80%*70%/(80%+70%)=74.7%. If good candidates are missed, it would reduce the recall, and hence reduce the F1 score (the accuracy).

Figure 16:
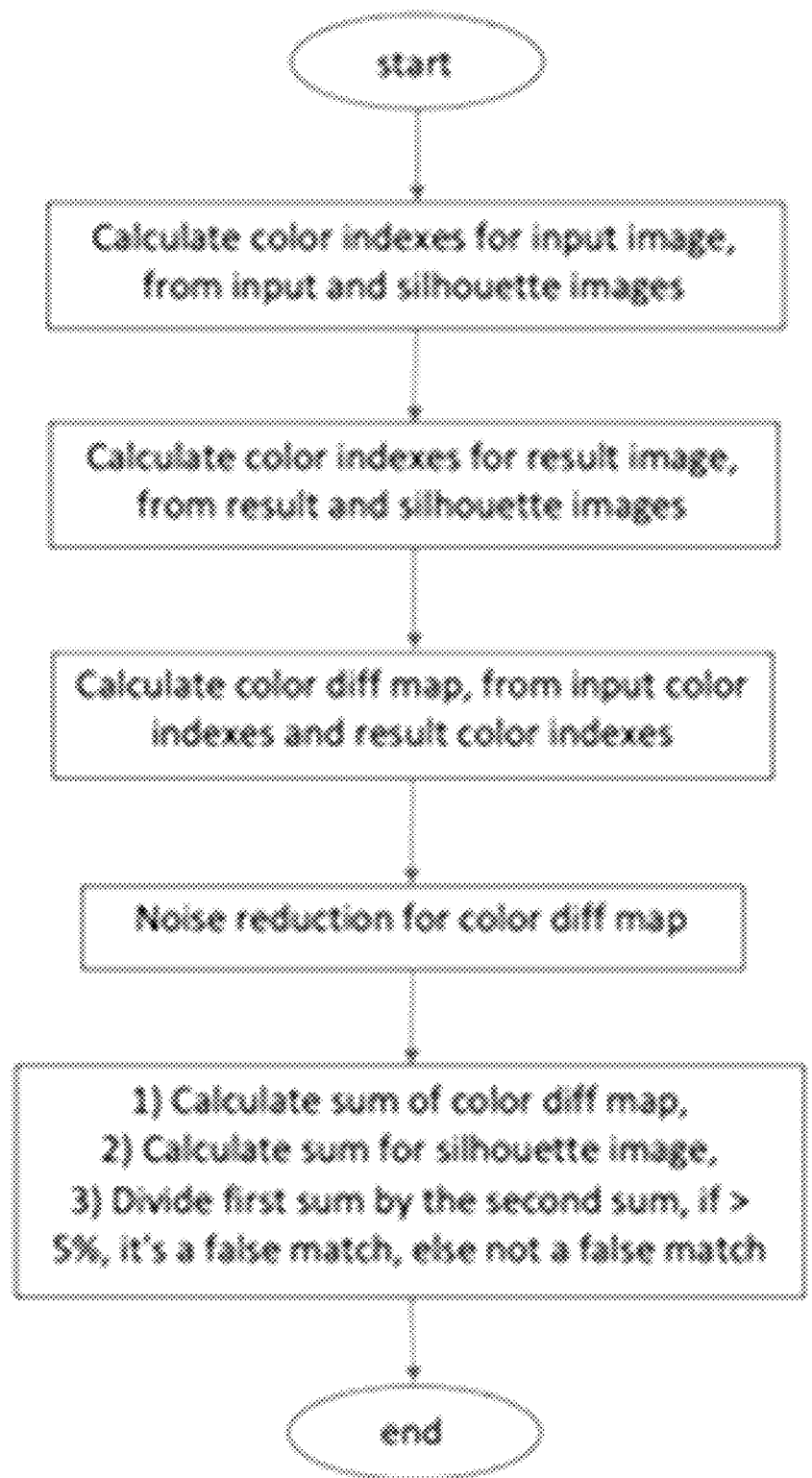
FIG. 16 illustrates a flow chart of addressing a patch color difference issue according to one aspect of the present disclosure.
Figure 17:
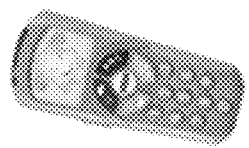
FIG. 17 illustrates input image and result images according to one aspect of the present disclosure.
Figure 17:
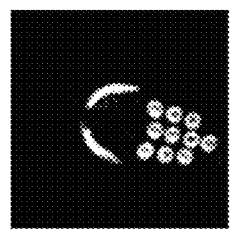
Figure 17:
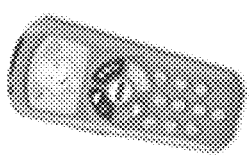
Figure 17:
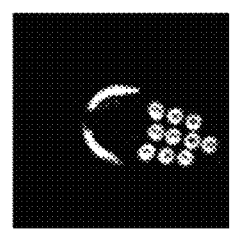
Figure 17:
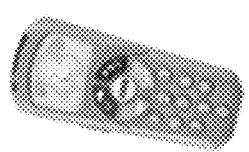
Figure 17:
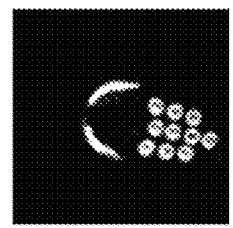
Figure 17:
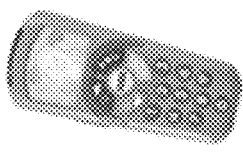
Figure 17:
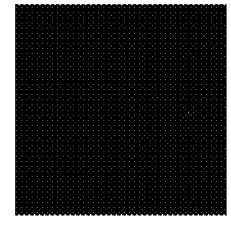
Figure 17:
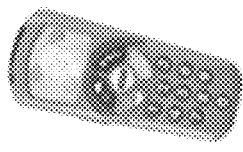

To address the patch color difference issue, the processor 120 may calculate the "color diff percent" to measure such color difference as illustrated in FIG. 16. For each result image, the processor 120 may create a color diff map by checking, for each pixel where pixels in silhouette are bright, if the color in the result image and the input image at the same position are same. If same color, the value is set to 0. If different color, then the value is set to 1. The "color" here is the index in the 64 color buckets. Then, the processor 120 may remove small patches using noise reduction with very high threshold (h=50). The processor 120 may get the sum of 1-bits in color diff map, the sum of the bright pixels in silhouette image, and calculate the percent. If this value is greater than the threshold (5%), two images may be considered different. The color diff may come from two different reasons. First, for the same product, the image may be taken by different people. The differences in lighting, angle or resolution may appear as random pixels and small spots. Second, there are actual significant differences, like the buttons on the remote. In this case, the differences appear as larger spots. The processor 120 may remove noises and small spots and to only preserve larger spots like the buttons. The processor 120 may have a parameter (the threshold h). The parameter may be set very high, to remove small spots that are not really noise. After that, the processor 120 may count how many bright pixels left, and then divide it by the total number of pixels. If the value is greater than 0.05 (5%), then the processor 120 may decide that it is a different image, otherwise they are "identical" images. FIG. 17 illustrate input image and result images. In FIG. 17, the top row illustrates example remote controls in different colors. The first and second remote controls from the left side may have blue keypads or buttons, and cartoon characters in the display may have green ears. In the remaining three remote controls, the cartoon characters may have orange ears. The middle remote control and the rightmost remote controls may have pink keypads. The second remote control from the right side may have a purple keypad.

Figure 18B:
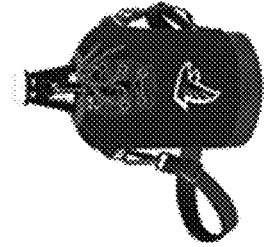
FIG. 18B illustrates returned matches for the beer bottle of FIG. 18A according to one aspect of the present disclosure.
Figure 18B:
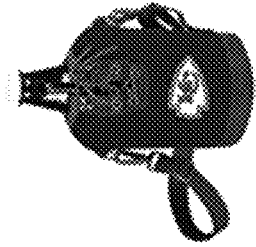
Figure 18A:
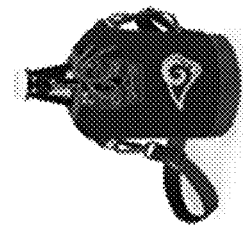
FIG. 18A illustrates a beer bottle as a search target according to one aspect of the present disclosure.
Figure 18A:
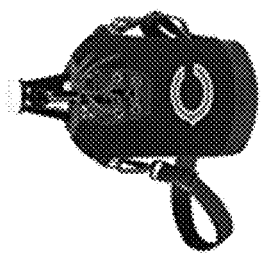
Figure 18A:
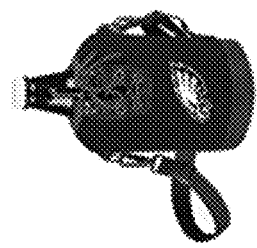
Figure 18A:

A second false identical match issue may be referred to as sub-area difference where objects are very similar except for difference in some small areas. The second false identical match issue may be caused by differences in sub-areas. Images are very similar to the input image but differ only in small areas inside the images, usually some kind of logos. For example, when searching for a beer bottle with NFL New Orleans Saints logo as illustrated in FIG. 18A, some similar images with different logos as illustrated in FIG. 18B may be returned.

This kind of issue may be difficult to fix, either by machine learning model or by shape and color vector, because the overall shapes are identical and color difference is very small. To address this issue, the processor 120 may create a sketch diff map, average all diff images to make actual diff areas stand out, threshold the average diff image, use clustering techniques to divide the average diff image into clusters, and finally compare cropped areas for all original images in the result group.

Figure 19:
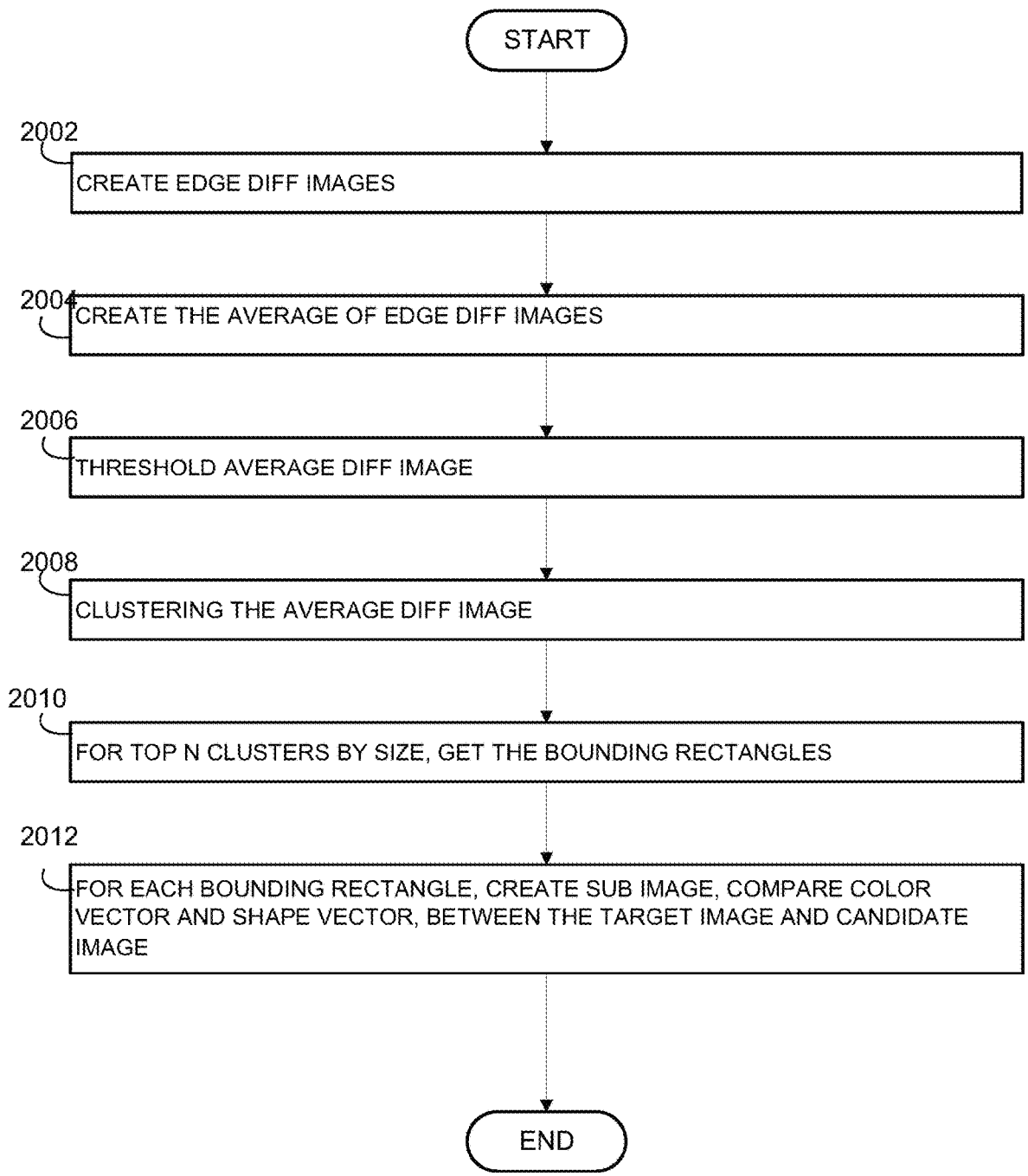
FIG. 19 illustrates a flow chart of fixing sub-area difference according to one aspect of the present disclosure.

FIG. 19 illustrates high-level steps. At 2002, the processor 120 may create edge diff images. At 2004, the processor 120 may create the average of edge diff images. At 2006, the processor 120 may threshold average diff image. At 2008, the processor 120 may clustering the average diff image. At 2010, the processor 120 may get the bounding rectangles for top n clusters by size. At 2012, the processor 120 may loop through each bounding rectangle, create sub image, compare color vector and shape vector, between the target image and candidate image.

Figure 20:
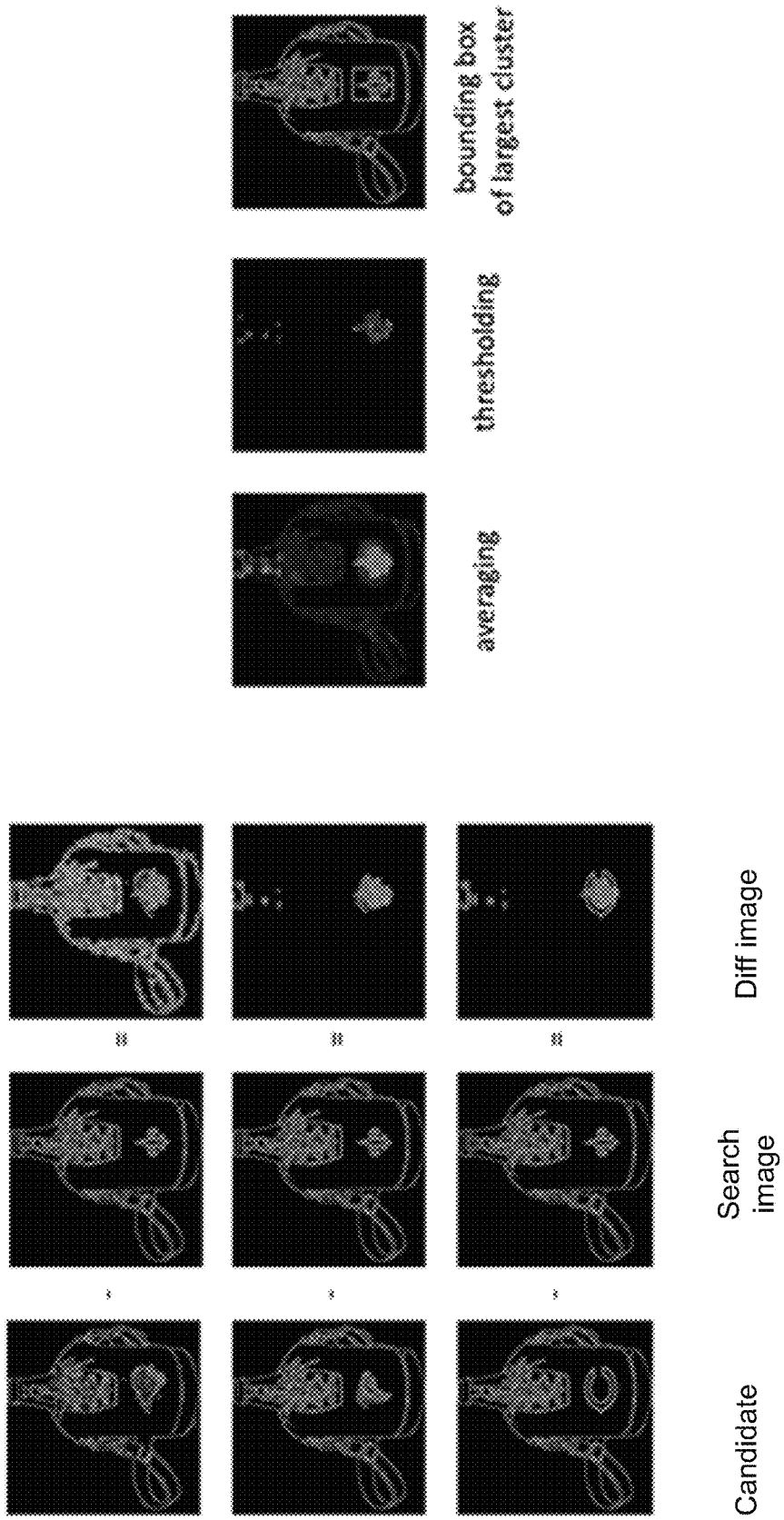
FIG. 20 illustrates a process of fixing sub-area difference according to one aspect of the present disclosure.

FIG. 20 illustrates the above algorithm. In FIG. 20, the first column is the edge detection image for candidate images (the false identical match). The second column is the edge detection image for the input image. The third column is the diff image between the first and second column. The fourth column (which has only one row) is the averaging of the third column. The fifth column is the thresholding of the average image. The last column shows the bounding rectangle of the largest cluster from the thresholding image.

The above algorithm may work under the following assumptions. First, the logo area may be isolated from the rest of the image. Second, candidate images may be in good alignment with the input image so that most of the non-relevant edges are removed in the diff step. Third, there may be enough candidate images so that averaging can eliminate noises. In FIG. 20, the top diff image has a lot of non-relevant difference, but after averaging and thresholding the logo area still stand out nicely due to large number of candidates. Fourth, the logo area may not be too big or too small. If it is too big, the subsequent comparison is unlikely to tell them apart. If it is too small, it is also difficult to have good comparison.

After the thresholding of average diff image is created, the processor 120 may perform clustering to divide pixels into disjointed regions for further comparison. The processor 120 may implement a clustering algorithm, such as DBSCAN (Density-Based Spatial Clustering of Applications with Noise).

Figure 21B:
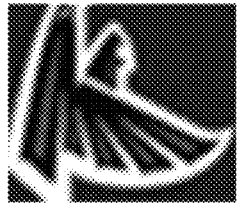
FIG. 21B illustrates other logos to be compared with the logo of FIG. 21A according to one aspect of the present disclosure.
Figure 21B:
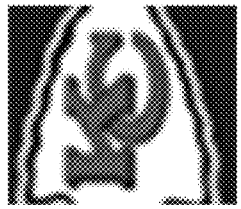
Figure 21B:
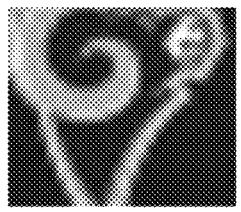
Figure 21B:
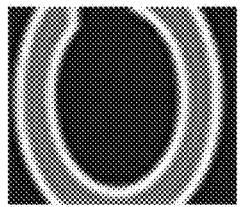
Figure 21B:
Figure 21A:
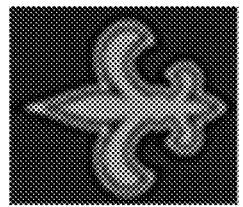
FIG. 21A illustrates a logo as a search target according to one aspect of the present disclosure.

At the last step, the processor 120 may compare the logo areas. For the beer bottle example, the processor 120 may compare New Orleans Saints logo as illustrated in FIG. 21A, with other logos as illustrated in FIG. 21B. The processor 120 may use combination shape vector and color vector for the sub-comparison.

In an experiment where 10.4 million product images are processed with two different CNN models, MobileNet model and NASNet model, and the shape and color vectorization. The Elasticsearch index is populated. 1,270 images are randomly selected to search against the entire image pool of 10.4 million images. Top search results are manually checked and labelled, and accuracy is calculated. The following table lists the micro averaging result, that is, count all positive, and negative cases, and then calculate the accuracy.

TABLE 2

| Algorithm | Precision | Recall | F1-Score | Criteria |
|---|---|---|---|---|
| MobileNet model | 41.3% | 96.2% | 57.8% | MobileNet score >= 0.90 |
| NASNet model | 32.2% | 90.4% | 47.4% | NASNet score >= 0.88 |
| shape/color vector | 80.0% | 87.2% | 83.5% | Shape score >= 0.92 & color score >= 0.965 |

In Table 2, "Criteria" are similarity threshold used to determine identical match. For example, in the first row MobileNet model, "MobileNet score>=0.90" means that if the score>=0.90, it's considered as an identical match.

The disclosed technology outperforms existing machine learning algorithms. For example, an average accuracy of the disclosed technology is 87%, which is better than machine learning algorithm of about 58%.

The image matching system 110 may be used as part of a browser extension in an affiliate marketing platform. For example, the image matching system 110 may be used part of shopping on non-member affiliated websites like Home Depot, which results in searching and matching by image lower priced alternatives on websites that are member affiliated. High volume items, such as a refrigerator, may be pre-searched and pre-matched before user views, so that alternatives may be presented to the user in near real time. Image matching may be used in merchandise such as cloths or shoes.

The image matching system 110 may be used to perform duplicate detection, e.g., two entries for a single product. The image matching process performed by the processor 120 may be used to remove or identify duplications in a system database. Duplicated entries may get merged together to increase quality control.

Turning back to FIG. 1, The processor 120 may include one or more of a microprocessor, microcontroller, digital signal processor, co-processor or the like or combinations thereof capable of executing stored instructions and operating upon stored data. The processor 120 may be one or more known processing devices, such as a microprocessor from the Pentium™ family manufactured by Intel™ or the Turion™ family manufactured by AMD™. The processor 120 may constitute a single core or multiple core processor that executes parallel processes simultaneously. For example, the processor 120 may be a single core processor that is configured with virtual processing technologies. In certain embodiments, the processor 120 may use logical processors to simultaneously execute and control multiple processes. The processor 120 may implement virtual machine technologies, or other similar known technologies to provide the ability to execute, control, run, manipulate, store, etc. multiple software processes, applications, programs, etc. One of ordinary skill in the art would understand that other types of processor arrangements could be implemented that provide for the capabilities disclosed herein.

The non-transitory computer readable medium 140 may contain an operating system ("OS") and a program. The non-transitory computer readable medium 140 may include, in some implementations, one or more suitable types of memory (e.g. such as volatile or non-volatile memory, random access memory (RAM), read only memory (ROM), programmable read-only memory (PROM), erasable programmable read-only memory (EPROM), electrically erasable programmable read-only memory (EEPROM), magnetic disks, optical disks, floppy disks, hard disks, removable cartridges, flash memory, a redundant array of independent disks (RAID), and the like), for storing files including an operating system, application programs (including, for example, a web browser application, a widget or gadget engine, and or other applications, as necessary), executable instructions and data. In one embodiment, the processing techniques described herein are implemented as a combination of executable instructions and data within the non-transitory computer readable medium 140. The non-transitory computer readable medium 140 may include one or more memory devices that store data and instructions used to perform one or more features of the disclosed embodiments. The non-transitory computer readable medium 140 may also include any combination of one or more databases controlled by memory controller devices (e.g., server(s), etc.) or software, such as document management systems, Microsoft™ SQL databases, SharePoint™ databases, Oracle™ databases, Sybase™ databases, or other relational or non-relational databases. The non-transitory computer readable medium 140 may include software components that, when executed by the processor 120, perform one or more processes consistent with the disclosed embodiments. In some embodiments, the non-transitory computer readable medium 140 may include a database to perform one or more of the processes and functionalities associated with the disclosed embodiments. The non-transitory computer readable medium 140 may include one or more programs to perform one or more functions of the disclosed embodiments. Moreover, the processor 120 may execute one or more programs located remotely from the image matching system 110. For example, the image matching system 110 may access one or more remote programs, that, when executed, perform functions related to disclosed embodiments.

Turning back to FIG. 1, the networks 180 may include a network of interconnected computing devices more commonly referred to as the internet. The network 180 may be of any suitable type, including individual connections via the internet such as cellular or WiFi networks. In some embodiments, the network 180 may connect terminals, services, and mobile devices using direct connections such as radio-frequency identification (RFID), near-field communication (NFC), Bluetooth™, low-energy Bluetooth™ (BLE), WiFi™, ZigBee™, ambient backscatter communications (ABC) protocols, USB, WAN, or LAN. Because the information transmitted may be personal or confidential, security concerns may dictate one or more of these types of connections be encrypted or otherwise secured. In some embodiments, however, the information being transmitted may be less personal, and therefore the network connections may be selected for convenience over security. The network 180 may comprise any type of computer networking arrangement used to exchange data. For example, the network 180 may be the Internet, a private data network, virtual private network using a public network, and/or other suitable connection(s) that enables components in system environment 100. The network 180 may also include a public switched telephone network ("PSTN") and/or a wireless network. The network 180 may also include local network that comprises any type of computer networking arrangement used to exchange data in a localized area, such as WiFi, Bluetooth™ Ethernet, and other suitable network connections that enable components of system environment 100 to interact with one another.

While certain implementations of the disclosed technology have been described in connection with what is presently considered to be the most practical and various implementations, it is to be understood that the disclosed technology is not to be limited to the disclosed implementations, but on the contrary, is intended to cover various modifications and equivalent arrangements included within the scope of the appended claims. Although specific terms are employed herein, they are used in a generic and descriptive sense only and not for purposes of limitation.

Certain implementations of the disclosed technology are described above with reference to block and flow diagrams of systems and methods and/or computer program products according to example implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some implementations of the disclosed technology.

These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks.

Implementations of the disclosed technology may provide for a computer program product, comprising a computer-usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

This written description uses examples to disclose certain implementations of the disclosed technology, including the best mode, and also to enable any person skilled in the art to practice certain implementations of the disclosed technology, including making and using any devices or systems and performing any incorporated methods. The patentable scope of certain implementations of the disclosed technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. An image matching system, comprising:
   a non-transitory computer-readable medium configured to store information of a plurality of images; and
   a processor configured to:
      identify an object area in an original image that illustrates an object;
      normalize the object area, resulting in a normalized image;
      calculate a shape vector and a color vector from the normalized image;
      calculate a match score using the shape vector and the color vector; and
      determine if the non-transitory computer-readable medium stores an identical match for the original image based on the match score,
   wherein the processor is configured to:
      generate a sketch image from the original image;
      identify a bounding rectangle in the sketch image;
      crop the sketch image with the bounding rectangle, resize and pad the cropped sketch image, resulting in the normalized image; and
      calculate the shape vector from the normalized image.

2. The image matching system of claim 1, wherein the processor is configured to:
   pre-rotate the sketch image based on a principal axis of the object; and
   generate the normalized image from the pre-rotated sketch image.

3. The image matching system of claim 2, wherein the processor is configured to:
   generate one or more normalized images by further rotating the pre-rotated sketch image; and
   calculate the shape vector from each of the normalized images.

4. The image matching system of claim 1, wherein the processor is configured to:
   generate a silhouette image from the original image;

resize the silhouette image, resulting in the normalized image; and
calculate the color vector from color and the normalized image.

5. The image matching system of claim 1, wherein the processor is configured to:
determine if the identical match is falsely identified by performing false identical match check.

6. The image matching system of claim 1, wherein the processor is configured to generate the sketch image from the original image by using edge detection.

7. The image matching system of claim 6, wherein the processor is configured to use edge detection with three different sets of threshold values, dilate with different iterations for high-resolution, medium-resolution and low-resolution edge images, and combine the three edge images with a logical OR operation.

8. The image matching system of claim 4, wherein the processor is configured to generate the silhouette image from the original image by segmenting main objects from a background using image segmentation.

9. The image matching system of claim 4, wherein the processor is configured to:
generate from the original image a sketch image, based on which the shape vector is calculated; and
perform a logical OR operation between the silhouette image and the sketch image.

10. The image matching system of claim 1, wherein the processor is configured to crop the sketch image with the bounding rectangle so that the object is enclosed in the bounding rectangle and touches either both top and bottom edges or both left and right edges of the bounding rectangle.

11. The image matching system of claim 1, wherein the processor is configured to resize the cropped sketch image to a standard size.

12. The image matching system of claim 1, wherein the processor is configured to pad the resized sketch image to be square.

13. The image matching system of claim 1, wherein the processor is configured to calculate the shape vector by dividing the normalized sketch image into a plurality of cells.

14. The image matching system of claim 13, wherein the processor is configured to count bright pixels per cell.

15. The image matching system of claim 1, wherein the processor is configured to calculate the color vector by looping through each foreground pixel and assign it to one of 64 buckets.

16. The image matching system of claim 1, wherein the processor is configured to normalize the color vector.

17. The image matching system of claim 1, wherein the processor is configured to calculate four locality sensitive hashing values for both the shape vector and the color vector.

18. An image matching method, comprising:
identifying, by a processor, an object area in an original image that illustrates an object;
normalizing, by the processor, the object area, resulting in a normalized image;
calculating, by the processor, a shape vector and a color vector from the normalized image;
calculating, by the processor, a match score using the shape vector and the color vector; and
determining, by the processor, if a non-transitory computer-readable medium stores an identical match for the original image based on the match score, wherein the non-transitory computer-readable medium stores information of a plurality of images,
wherein the processor is configured to:
generate a sketch image from the original image;
identify a bounding rectangle in the sketch image;
crop the sketch image with the bounding rectangle, resize and pad the cropped sketch image, resulting in the normalized image; and
calculate the shape vector from the normalized image.

19. A computer program product for image matching, the computer program product comprising a computer-readable storage medium containing computer program code for:
identifying, by a processor, an object area in an original image that illustrates an object;
normalizing, by the processor, the object area, resulting in a normalized image;
calculating, by the processor, a shape vector and a color vector from the normalized image;
calculating, by the processor, a match score using the shape vector and the color vector; and
determining, by the processor, if a non-transitory computer-readable medium stores an identical match for the original image based on the match score, wherein the non-transitory computer-readable medium stores information of a plurality of images,
wherein the processor is configured to:
generate a sketch image from the original image;
identify a bounding rectangle in the sketch image;
crop the sketch image with the bounding rectangle, resize and pad the cropped sketch image, resulting in the normalized image; and
calculate the shape vector from the normalized image.

* * * * *